United States Patent
Taki et al.

(10) Patent No.: US 11,921,336 B2
(45) Date of Patent: Mar. 5, 2024

(54) RETICULATED TUBE, OPTICAL FIBER PROTECTIVE UNIT, METHOD FOR PROTECTING OPTICAL FIBER, AND METHOD FOR MANUFACTURING RETICULATED TUBE

(71) Applicant: FUJIKURA LTD., Tokyo (JP)

(72) Inventors: Go Taki, Chiba (JP); Masayuki Ishioka, Chiba (JP); Mizuki Isaji, Chiba (JP); Tomoaki Kaji, Chiba (JP); Soichiro Kaneko, Chiba (JP); Koji Tomikawa, Chiba (JP); Akira Namazue, Chiba (JP); Ken Osato, Chiba (JP)

(73) Assignee: Fujikura Ltd., Tokyo (JP)

(*) Notice: Subject to any disclaimer, the term of this patent is extended or adjusted under 35 U.S.C. 154(b) by 0 days.

(21) Appl. No.: 17/982,661

(22) Filed: Nov. 8, 2022

(65) Prior Publication Data
US 2023/0053868 A1   Feb. 23, 2023

Related U.S. Application Data

(63) Continuation of application No. 17/282,626, filed as application No. PCT/JP2019/036612 on Sep. 18, 2019, now Pat. No. 11,525,972.

(30) Foreign Application Priority Data

Oct. 4, 2018   (JP) .................................. 2018-189278

(51) Int. Cl.
*G02B 6/44*   (2006.01)

(52) U.S. Cl.
CPC ........... *G02B 6/443* (2013.01); *G02B 6/4486* (2013.01)

(58) Field of Classification Search
CPC .............................. G02B 6/443; G02B 6/4486
See application file for complete search history.

(56) References Cited

U.S. PATENT DOCUMENTS 3,691,001 A * 9/1972 Takahashi .............. G02B 6/443
                                                       385/115
4,896,940 A * 1/1990 Kathiresan ........... G02B 6/4403
                                                       385/112
(Continued)

FOREIGN PATENT DOCUMENTS

BE    861780 A    3/1978
CN    2583138 Y   10/2003
(Continued)

OTHER PUBLICATIONS

Examination Report issued in corresponding Australian Patent Application No. 2019355385, dated Aug. 9, 2022 (5 pages).
(Continued)

*Primary Examiner* — Charlie Y Peng
(74) *Attorney, Agent, or Firm* — Osha Bergman Watanabe & Burton LLP

(57) ABSTRACT

An optical fiber protective unit includes: a reticulated tube; and a tubular member that is inserted through the reticulated tube and that is configured to accommodate a plurality of optical fibers. The reticulated tube is disposed on an outer periphery of the tubular member in a state folded in a longitudinal direction. Both end parts of the reticulated tube are located on the outer periphery of the tubular member.

17 Claims, 21 Drawing Sheets

(56) References Cited

U.S. PATENT DOCUMENTS

| | | | |
|---|---|---|---|
| 5,212,750 A * | 5/1993 | Wright | G02B 6/4471 385/86 |
| 5,480,203 A | 1/1996 | Favalora et al. | |
| 7,664,363 B1 * | 2/2010 | Mowery, Sr. | G02B 6/4471 385/137 |
| 2009/0245743 A1 | 10/2009 | Cote et al. | |
| 2011/0091169 A1 | 4/2011 | Van Der Meulen et al. | |
| 2011/0236614 A1 | 9/2011 | Ushikai et al. | |
| 2012/0189258 A1 | 7/2012 | Overton et al. | |
| 2015/0125122 A1 | 5/2015 | Winarski | |
| 2015/0337465 A1 * | 11/2015 | Woodruff | D03D 13/004 28/142 |
| 2018/0058980 A1 | 3/2018 | Babu et al. | |
| 2018/0120530 A1 | 5/2018 | Compton et al. | |
| 2021/0349280 A1 | 11/2021 | Takeda et al. | |

FOREIGN PATENT DOCUMENTS

| | | |
|---|---|---|
| CN | 102239615 A | 11/2011 |
| CN | 104426093 A | 3/2015 |
| CN | 108318986 A | 7/2018 |
| EP | 0481724 A2 | 4/1992 |
| EP | 0499089 A1 | 8/1992 |
| JP | S63-49356 U | 4/1988 |
| JP | H05-11720 U | 2/1993 |
| JP | H07-281037 A | 10/1995 |
| JP | H10-137176 A | 5/1998 |
| JP | H10-329215 A | 12/1998 |
| JP | 2002-10441 A | 1/2002 |
| JP | 2003149456 A | 5/2003 |
| JP | 2003-262771 A | 9/2003 |
| JP | 2004-219502 A | 8/2004 |
| JP | 2004-350382 A | 12/2004 |
| JP | 2010-148335 A | 7/2010 |
| JP | 2010-231047 A | 10/2010 |
| JP | 2011-169939 A | 9/2011 |
| JP | 2013-037253 A | 2/2013 |
| JP | 2013-074717 A | 4/2013 |
| JP | 2013-97320 A | 5/2013 |
| JP | 2015-046971 A | 3/2015 |
| JP | 2015075639 A | 4/2015 |
| JP | 2016-221966 A | 12/2016 |
| JP | 2017-215438 A | 12/2017 |
| JP | 2018-049081 A | 3/2018 |
| TW | 201319653 A | 5/2013 |
| TW | 201821844 A | 6/2018 |
| WO | 2015/053146 A1 | 4/2015 |

OTHER PUBLICATIONS

Techflex, "How to Use the Techflex Flexo Sleeving Rapid Install Tool," YouTube, published Jun. 23, 2016, Website: https://www.youtube.com/watch?v=EOxH4ZVhdqg.

* cited by examiner

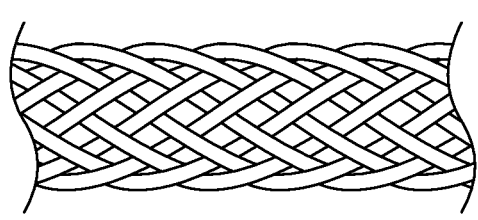 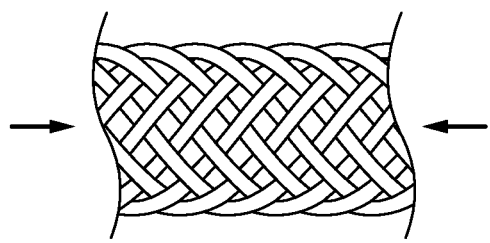
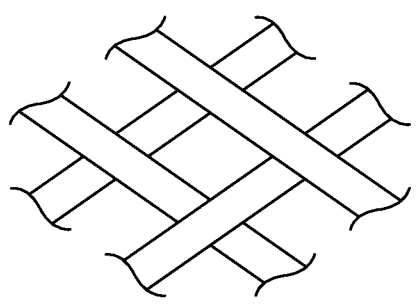 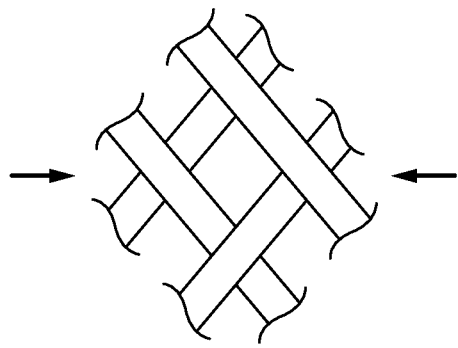
FIG. 6A　　　　　　　　　　　　FIG. 6B

MESH RATIO $R(\%) = \dfrac{S1}{S1+S2} \times 100$

S1: AREA OCCUPIED BY OPENINGS 10A
S2: AREA OCCUPIED BY PERIPHERAL PARTS 10B

| NUMBER | 10 | | 8 | | | 6 | | | 4 | | 2 | |
|---|---|---|---|---|---|---|---|---|---|---|---|---|
| SPIRAL PITCH [mm] | 100 | 150 | 180 | 100 | 150 | 180 | 100 | 150 | 180 | 150 | 180 | 150 | 180 |
| MESH RATIO [%] | 8.1 | 12.2 | 14.6 | 16.9 | 18.8 | 20.8 | 28.1 | 30.2 | 36.4 | 38.5 | 43.6 | 61.0 | 73.2 |
| CATCHING ON PERIPHERAL MEMBER | ○ | ○ | ○ | ○ | ○ | ○ | ○ | ○ | ○ | ○ | ○ | × | × |

FIG. 17

| NO. | NUMBER N OF OPTICAL FIBERS | NUMBER S OF FIRST WIRES | NUMBER S OF SECOND WIRES | INNER DIAMETER D [mm] | PITCH P [mm] | UNIT DIAMETER Y [mm] | D/Y | P×D/Y [mm] | OVERALL EVALUATION | WIRE PASSING WORKABILITY | FASTENING OR PROTRUDING | HANDLEABILITY |
|---|---|---|---|---|---|---|---|---|---|---|---|---|
| 1 | 288 | 2 | 2 | 5 | 36 | 5 | 1.0 | 36.0 | × | ○ | × | △ |
| 2 | 288 | 4 | 4 | 5 | 18 | 5 | 1.0 | 18.0 | ○ | ○ | ○ | ○ |
| 3 | 288 | 6 | 6 | 5 | 12 | 5 | 1.0 | 12.0 | ○ | ○ | ○ | ○ |
| 4 | 288 | 8 | 8 | 5 | 9 | 5 | 1.0 | 9.0 | ○ | ○ | ○ | ○ |
| 5 | 288 | 12 | 12 | 5 | 6 | 5 | 1.0 | 6.0 | ○ | ○ | ○ | ○ |
| 6 | 288 | 6 | 6 | 3 | 12 | 5 | 0.6 | 7.2 | ○ | ○ | ○ | ○ |
| 7 | 288 | 6 | 6 | 4 | 12 | 5 | 0.8 | 9.6 | ○ | ○ | ○ | ○ |
| 8 | 288 | 6 | 6 | 6 | 12 | 5 | 1.2 | 14.4 | ○ | ○ | ○ | ○ |
| 9 | 288 | 6 | 6 | 7 | 12 | 5 | 1.4 | 16.8 | × | ○ | × | △ |
| 10 | 72 | 2 | 2 | 2 | 18 | 2.5 | 0.8 | 14.4 | ○ | ○ | ○ | ○ |
| 11 | 72 | 2 | 2 | 2.5 | 18 | 2.5 | 1.0 | 18.0 | ○ | ○ | ○ | ○ |
| 12 | 72 | 4 | 4 | 2 | 12 | 2.5 | 0.8 | 9.6 | ○ | ○ | ○ | ○ |
| 13 | 72 | 4 | 4 | 2.5 | 12 | 2.5 | 1.0 | 12.0 | ○ | ○ | ○ | ○ |
| 14 | 72 | 6 | 6 | 2 | 6 | 2.5 | 0.8 | 4.8 | × | ○ | × | ○ |
| 15 | 72 | 6 | 6 | 2.5 | 6 | 2.5 | 1.0 | 6.0 | ○ | ○ | ○ | ○ |
| 16 | 144 | 2 | 2 | 3 | 24 | 3.6 | 0.8 | 20.0 | ○ | ○ | ○ | ○ |
| 17 | 144 | 2 | 2 | 3.2 | 24 | 3.6 | 0.9 | 21.3 | × | ○ | × | ○ |
| 18 | 144 | 2 | 2 | 3.6 | 24 | 3.6 | 1.0 | 24.0 | × | ○ | × | △ |
| 19 | 144 | 2 | 2 | 4 | 24 | 3.6 | 1.1 | 26.7 | × | ○ | × | ○ |
| 20 | 144 | 4 | 4 | 3 | 16 | 3.6 | 0.8 | 13.3 | ○ | ○ | ○ | ○ |
| 21 | 144 | 4 | 4 | 3.2 | 16 | 3.6 | 0.9 | 14.2 | ○ | ○ | ○ | ○ |
| 22 | 144 | 4 | 4 | 3.6 | 16 | 3.6 | 1.0 | 16.0 | ○ | ○ | ○ | ○ |
| 23 | 144 | 4 | 4 | 4 | 16 | 3.6 | 1.1 | 17.8 | ○ | ○ | ○ | ○ |
| 24 | 144 | 6 | 6 | 3 | 9 | 3.6 | 0.8 | 7.5 | ○ | ○ | ○ | ○ |
| 25 | 144 | 6 | 6 | 3.2 | 9 | 3.6 | 0.9 | 8.0 | ○ | ○ | ○ | ○ |
| 26 | 144 | 6 | 6 | 3.6 | 9 | 3.6 | 1.0 | 9.0 | ○ | ○ | ○ | ○ |
| 27 | 144 | 4 | 4 | 4 | 18 | 5 | 0.8 | 10.0 | ○ | ○ | ○ | ○ |
| 28 | 288 | 4 | 4 | 4.5 | 18 | 5 | 0.9 | 14.4 | ○ | ○ | ○ | ○ |
| 29 | 288 | 4 | 4 | 6 | 18 | 5 | 1.2 | 16.2 | ○ | ○ | ○ | ○ |
| 30 | 288 | 8 | 8 | 4 | 9 | 5 | 0.8 | 21.6 | × | ○ | × | △ |
| 31 | 288 | 8 | 8 | 4.5 | 9 | 5 | 0.9 | 7.2 | ○ | ○ | ○ | ○ |
| 32 | 288 | 8 | 8 | 6 | 9 | 5 | 1.2 | 8.1 | ○ | ○ | ○ | ○ |
| 33 | 288 | 8 | 8 | 6 | 9 | 5 | 1.2 | 10.8 | ○ | ○ | ○ | ○ |
| 40 | 288 | 6 | 6 | 2.5 | 12 | 5 | 0.5 | 6.0 | × | △ | × | ○ |

FIG. 18

INNER DIAMETER $D = L \times \tan(\theta/2)/\pi$

| NO. | MATERIAL | CROSS-SECTIONAL SHAPE (mm) | CONTRACTION RATIO RL(%) (LENGTH L1 DURING CONTRACTION /INITIAL LENGTH L0 × 100%) |
|---|---|---|---|
| 1 | DOUBLE-LAYER MONOFILAMENT | 1.5 × 0.15 | 8 |
| 2 | | 1.5 × 0.10 | 5 |
| 3 | | 1.5 × 0.05 | 4 |
| 4 | SINGLE-LAYER MONOFILAMENT | 1.5 × 0.15 | 8 |
| 5 | | 1.5 × 0.10 | 5 |
| 6 | | 1.5 × 0.05 | 4 |
| 7 | FILM | 1.5 × 0.10 | 13 |
| 8 | | 1.5 × 0.08 | 12 |
| 9 | | 1.5 × 0.05 | 11 |

FIG. 20

| NO. | MATERIAL | CROSS-SECTIONAL SHAPE (mm) | LOSS FLUCTUATION (dB) |
|---|---|---|---|
| 1 | DOUBLE-LAYER MONOFILAMENT | 1.5 × 0.15 | 0.01 OR LESS |
| 2 | | 1.5 × 0.10 | 0.01 OR LESS |
| 3 | | 1.5 × 0.05 | 0.01 OR LESS |
| 4 | SINGLE-LAYER MONOFILAMENT | 1.5 × 0.15 | 0.08 |
| 5 | | 1.5 × 0.10 | 0.13 |
| 6 | | 1.5 × 0.05 | 0.24 |

FIG. 21

RETICULATED TUBE, OPTICAL FIBER PROTECTIVE UNIT, METHOD FOR PROTECTING OPTICAL FIBER, AND METHOD FOR MANUFACTURING RETICULATED TUBE

CROSS-REFERENCE TO RELATED APPLICATIONS

This is a continuation application of U.S. patent application Ser. No. 17/282,626, filed on Apr. 2, 2021, which is a national stage of International Patent Application No. PCT/JP2019/036612, filed on Sep. 18, 2019, which claims priority from Japanese Patent Application No. 2018-189278, filed on Oct. 4, 2018. The contents of these applications are incorporated herein by reference in their entirety.

TECHNICAL FIELD

The present invention relates to a reticulated tube, an optical fiber protective unit, a method for protecting an optical fiber, and a method for manufacturing a reticulated tube.

BACKGROUND

Patent Literatures 1 to 4 describe an optical fiber unit formed by wrapping a bundling member around a bundle of a plurality of optical fibers. Patent Literatures 3 and 4 describe a method for manufacturing an optical fiber unit by wrapping a bundling member around a bundle of a plurality of optical fibers.

Further, Patent Literatures 5 to 7 describe various tubes. Patent Literature 5 describes a protective tube that protects an optical fiber by covering an outer periphery of the optical fiber. Patent Literature 6 describes that a plastic line or a metal line is braided and formed into a cylindrical net capable of extension and contraction to protect wiring. Patent Literature 7 describes a net tube having a diameter enlarged when the net tube shrinks, and that the net tube protects an electric wire.

CITATION LIST

Patent Literature

Patent Literature 1: WO 2015/053146
Patent Literature 2: JP 2011-169939A
Patent Literature 3: JP 2013-97320A
Patent Literature 4: JP 2018-049081A
Patent Literature 5: JP 2017-215438A
Patent Literature 6: JPU 63(1988)-49356A
Patent Literature 7: JP 2002-10441A The bundling member described in Patent Literatures 1 to 4 is wrapped around an outer periphery of a bundle of a plurality of optical fibers at a manufacturing factory in order to bind the plurality of optical fibers. Thus, the bundling member described in Patent Literatures 1 to 4 does not protect the optical fibers, and is not inserted with the optical fibers therethrough. Further, the bundling member described in Patent Literatures 1 to 4 is not assumed to be attached to an outer periphery of a bundle of optical fibers when the optical fibers are laid at a laying site (it should be noted that it is difficult to attach the bundling member described in Patent Literatures 1 to 4 to an outer periphery of a bundle of optical fibers when the optical fibers are laid at a laying site).

Further, in a case of the protective tube described in Patent Literature 5 and a spiral tube described in the prior art in Patent Literature 6, work for inserting optical fibers takes time and effort. In a case of a braided tube (tube constituted by braiding a wire) described in Patent Literatures 6 and 7, the amount of extension and contraction in a longitudinal direction is small, and thus work for inserting optical fibers also takes time and effort in this case. In addition, when optical fibers are inserted through the braided tube having the diameter changed during extension and contraction, a diameter becomes thin when the braided tube is extended in the longitudinal direction. Thus, pressure is applied to the optical fibers inserted through the inside, and a transmission loss of the optical fibers increases.

SUMMARY

One or more embodiments of the present invention provide a new protective tube that is configured to be inserted with optical fibers through the tube when the optical fibers are laid, has a great amount of extension and contraction in a longitudinal direction, and suppresses a diameter becoming thin during extension.

One or more embodiments of the present invention is a reticulated tube comprising openings reticulately formed, and the reticulated tube is configured to be inserted with a plurality of optical fibers through the reticulated tube.

Other features of embodiments of the invention are made clear by the following description and the drawings.

With one or more embodiments of the present invention, it is possible to protect a plurality of optical fibers by inserting the optical fibers through a reticulated tube when the optical fibers are laid. Since openings are reticulately formed, the amount of extension and contraction in a longitudinal direction is great, and it is possible to suppress a diameter becoming thin during extension.

BRIEF DESCRIPTION OF DRAWINGS

FIG. 6A is an explanatory diagram of a shape of a braided tube according to a comparative example. FIG. 6B is an enlarged explanatory diagram of the vicinity of a mesh of the braided tube according to the comparative example.

FIG. 17 is a table illustrating an evaluation in a first example according to one or more embodiments.

FIG. 18 is a table illustrating a second example according to one or more embodiments.

FIG. 20 is a table illustrating a third example according to one or more embodiments.

FIG. 21 is a table illustrating a fourth example according to one or more embodiments.

DETAILED DESCRIPTION

Figure 1A:
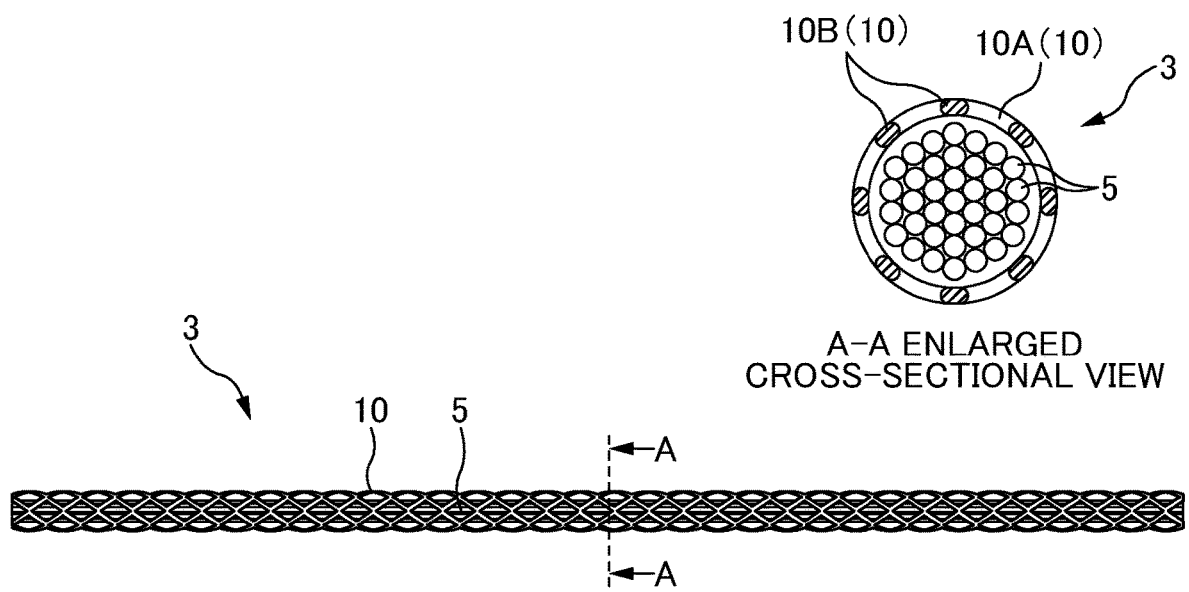
FIG. 1A is an explanatory diagram of an optical fiber unit 3 according to one or more embodiments.

At least the following matters are made clear from the following description and the drawings.

A reticulated tube will become clear comprising openings reticulately formed, and the reticulated tube is configured to be inserted with a plurality of optical fibers through the reticulated tube. With this reticulated tube, it is possible to protect a plurality of optical fibers by inserting the optical fibers through the reticulated tube when the optical fibers are laid. The reticulated tube comprising: peripheral parts that form the openings; and a branch part that is formed in a boundary of three or more openings, the branch part including three or more peripheral parts extending from the branch part, wherein the peripheral parts are restricted by the branch part and are bendable. In this way, the amount of extension and contraction in the longitudinal direction is great, and it is possible to suppress a diameter becoming thin during extension.

In one or more embodiments, the reticulated tube may be configured to fold in a longitudinal direction by bending the peripheral parts. In this way, it is possible to provide the reticulated tube that greatly contracts in the longitudinal direction.

In one or more embodiments, a bent section of the peripheral parts may be configured to deform plastically, and the peripheral parts may be configured to be held in a bent shape. In this way, the reticulated tube can have shape retention in a bent state.

In one or more embodiments, the reticulated tube may comprise a plurality of first wires disposed in a spiral shape in a predetermined direction, and a plurality of second wires disposed in a direction different from that of the first wires, the first wire or the second wire constitutes the peripheral parts, and a bonding part made by bonding an intersection point of the first wire and the second wire constitutes the branch part. In this way, it is possible to easily manufacture the reticulated tube.

In one or more embodiments, the intersection point of the first wire and the second wire may be fusion-bonded. In this way, it is possible to easily manufacture the reticulated tube.

In one or more embodiments, on a cross section on which the branch part is present, two or more branch parts may be present. In this way, it is possible to suppress a diameter becoming thin during extension. In one or more embodiments, on a cross section on which the branch part is present, three or more branch parts may be present. In this way, since a polygonal space with the plurality of branch parts as vertexes on the cross section can be held, it is possible to suppress pressure applied to the optical fibers disposed in the space.

In one or more embodiments, when an area occupied by the openings with the reticulated tube being developed is S1 and an area occupied by the peripheral parts is S2, a value of S1/(S1+S2) may be less than or equal to 0.555. In this way, it is possible to suppress the optical fibers inserted through the reticulated tube being caught on a peripheral member.

In one or more embodiments, when a length of the reticulated tube before contraction in a longitudinal direction is L0 and a length of the reticulated tube after contraction in the longitudinal direction is L1, L1/L0 may be less than or equal to 0.13. In this way, it is possible to provide the reticulated tube capable of greatly contracting in the longitudinal direction.

In one or more embodiments, the reticulated tube may include an end part from which the optical fibers can be inserted. In this way, it is possible to insert the plurality of optical fibers from an insertion opening of the reticulated tube when the optical fibers are laid.

An optical fiber protective unit will become clear, comprising: a reticulated tube in which openings are reticulately formed, the reticulated tube being configured to be inserted with a plurality of optical fibers through the reticulated tube; and a tubular member that is inserted through the reticulated tube, the tubular member being configured to be inserted with the plurality of optical fibers through the tubular member, wherein the reticulated tube includes peripheral parts that form the openings, and a branch part that is formed in a boundary of three or more openings, the branch part including three or more peripheral parts extending from the branch part, and the peripheral parts are restricted by the branch part and is bendable. With this optical fiber protective unit, work for inserting the optical fibers through the reticulated tube is facilitated.

In one or more embodiments, the reticulated tube may be disposed on an outer periphery of the tubular member while being folded in a longitudinal direction by bending the peripheral parts of the openings. In this way, work for inserting the optical fibers through the reticulated tube is facilitated.

In one or more embodiments, the reticulated tube in a folded state may be extendable in a longitudinal direction by pulling out an end part of the reticulated tube from the tubular member. In this way, work for inserting the optical fibers through the reticulated tube is facilitated.

In one or more embodiments, an opening of at least one end part of the tubular member may be widened. In this way, work for inserting a bundle of the optical fibers from the end part of the tubular member is facilitated.

In one or more embodiments, an outer diameter of the end part having a widened opening may be greater than an inner diameter of the reticulated tube in the folded state. In this way, it is possible to suppress one end of the reticulated tube coming out of the tubular member.

A method for protecting an optical fiber will become clear, the method comprising: preparing a reticulated tube in which openings are reticulately formed, the reticulated tube including peripheral parts that form the openings, and a branch part that is formed in a boundary of three or more openings, the branch part including three or more peripheral parts extending from the branch part, the peripheral parts being restricted by the branch part and being bendable; and inserting a plurality of optical fibers from an end part of the reticulated tube, and inserting the plurality of optical fibers through the reticulated tube. With this method for protecting an optical fiber, it is possible to protect a plurality of optical fibers by inserting the optical fibers through the reticulated tube when the optical fibers are laid.

In one or more embodiments, the reticulated tube folded in a longitudinal direction may be prepared by bending the peripheral parts; the plurality of optical fibers may be inserted from the end part of the reticulated tube in a folded state, and the plurality of optical fibers may be inserted through the reticulated tube in the folded state; and the reticulated tube may be extended, and the plurality of optical fibers may be inserted through the extended reticulated tube. In this way, work for inserting the optical fibers through the reticulated tube is facilitated.

In one or more embodiments, an optical fiber protective unit including the reticulated tube folded in a longitudinal direction may be prepared by bending the peripheral parts and a tubular member inserted through the reticulated tube; and the plurality of optical fibers may be inserted from the end part of the reticulated tube in the folded state by inserting the optical fibers into the tubular member, and the plurality of optical fibers may be inserted through the reticulated tube in the folded state. In this way, work for inserting the optical fibers through the reticulated tube is facilitated.

In one or more embodiments, the reticulated tube may include a plurality of first wires disposed in a spiral shape in a predetermined direction, and a plurality of second wires disposed in a direction different from that of the first wires, and intersection points of the first wire and the second wire are bonded, and, when a pitch of the intersection points in a longitudinal direction is P (mm), an inner diameter of the reticulated tube is D (mm), and a diameter of a unit constituted by the plurality of optical fibers is Y (mm), $0.6 \leq D/Y \leq 1.2$ and $6.0 \text{ (mm)} \leq P \times D/Y \leq 20.0 \text{ (mm)}$. In this way, it is possible to enhance properties such as wire passing workability of the reticulated tube.

A method for manufacturing a reticulated tube will become clear, the method comprising: forming a reticulated tube in which openings are reticulately formed, and the reticulated tube being configured to be inserted with a plurality of optical fibers through the reticulated tube, the reticulated tube including peripheral parts that form the openings, and a branch part that is formed in a boundary of three or more openings, the branch part including three or more peripheral parts extending from the branch part, the peripheral parts being restricted by the branch part and being bendable; and forming, in an end part of the reticulated tube, an insertion opening configured to receive insertion of the optical fibers. With this manufacturing method, it is possible to manufacture the reticulated tube capable of protecting the plurality of optical fibers by inserting the optical fibers when the optical fibers are laid. It is possible to manufacture the reticulated tube having a great amount of extension and contraction in the longitudinal direction, and capable of suppressing a diameter becoming thin during extension.

In one or more embodiments, the reticulated tube in a longitudinal direction may be prepared by bending the peripheral parts. In this way, it is possible to manufacture the reticulated tube capable of greatly contracting in the longitudinal direction.

In one or more embodiments, a plurality of first wires may be supplied to a heating section while twisting the plurality of first wires in a predetermined direction, a plurality of second wires may be supplied to the heating section while twisting the plurality of second wires in a reverse direction to the first wires, and an intersection point of the first wire and the second wire may be fused in the heating section, thus forming the reticulated tube in which the first wire or the second wire constitutes the peripheral parts, and a bonding part acquired by bonding an intersection point of the first wire and the second wire constitutes the branch part. In this way, it is possible to easily manufacture the reticulated tube.

Figure 1B:
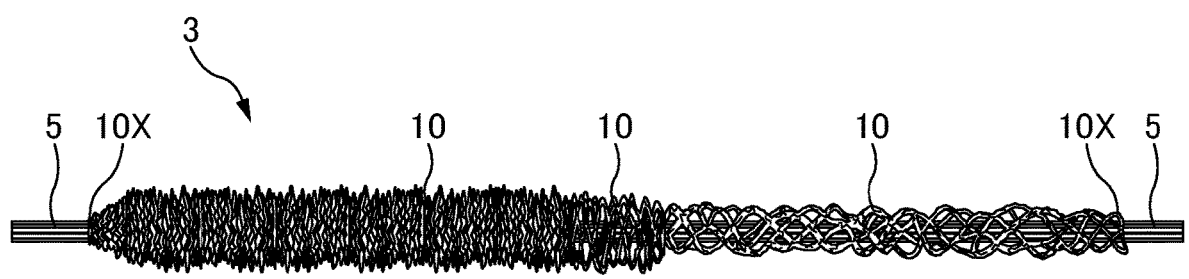
FIG. 1B is an explanatory diagram of the optical fiber unit 3 in a state in which a reticulated tube 10 is folded according to one or more embodiments.

Basic Configuration:

FIG. 1A is an explanatory diagram of an optical fiber unit 3 according to one or more embodiments. FIG. 1A also illustrates an enlarged cross-sectional view in an A-A cross section. FIG. 1B is an explanatory diagram of the optical fiber unit 3 in a state in which a reticulated tube 10 is folded.

The optical fiber unit 3 includes a plurality of optical fibers 5 and the reticulated tube 10. The plurality of optical fibers 5 are inserted through the reticulated tube 10. The plurality of optical fibers are inserted through the reticulated tube, and thus the optical fibers are protected. The plurality of the optical fibers 5 according to one or more embodiments are formed by bundling a plurality of intermittently connected optical fiber ribbons. However, the plurality of optical fibers 5 may be constituted by one intermittently connected optical fiber ribbon, and may be formed by bundling the plurality of single optical fibers 5. In one or more embodiments, as illustrated in FIG. 1B, the reticulated tube 10 is configured to be foldable in a longitudinal direction by bending a peripheral part 10B of an opening 10A. In one or more embodiments, as described later, a length of the reticulated tube 10 after contracting in the longitudinal direction can be less than or equal to 10% of a length of the reticulated tube 10 in an initial state (extended state) before the contraction.

An insertion opening in which the plurality of optical fibers 5 can be inserted is formed in an end part 10X on both sides of the reticulated tube 10. As described later, the reticulated tube 10 according to one or more embodiments is configured to be inserted with the plurality of optical fibers 5 from the end part 10X (insertion opening), and is configured to be inserted with the optical fibers 5 through the reticulated tube. In the following description, one end part 10X of the reticulated tube 10 may be referred to as a "first end", and the other end part 10X may be referred to as a "second end".

Figure 2A:
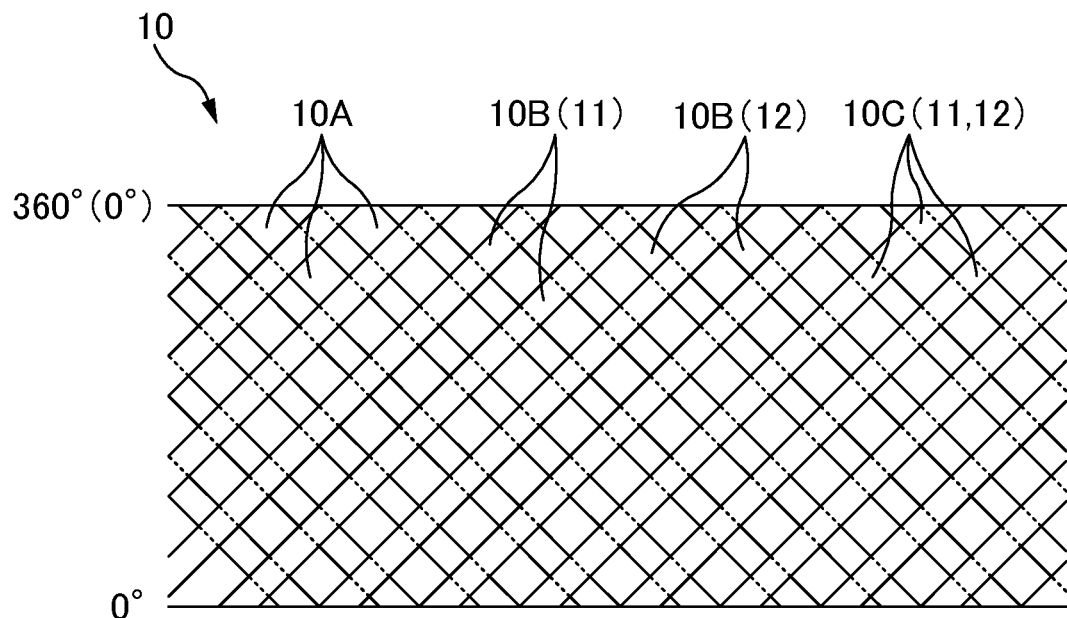
FIG. 2A is a developed view for illustrating a shape of the reticulated tube 10 according to one or more embodiments.
Figure 2B:
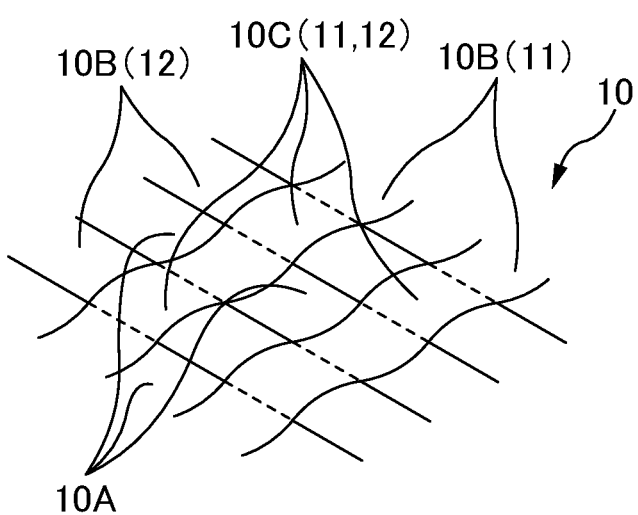
FIG. 2B is an enlarged perspective view of the reticulated tube 10 illustrated in FIG. 2A.

FIG. 2A is a developed view for illustrating a shape of the reticulated tube 10. FIG. 2A illustrates the reticulated tube 10 on a cylindrical coordinate system on the assumption that the reticulated tube 10 that is not bent is virtually disposed on a cylindrical plane. A horizontal axis in the diagram indicates a position in the longitudinal direction. A vertical axis indicates an angle from a reference position (0 degree), and indicates a position in a circumferential direction on the cylindrical plane. FIG. 2B is an enlarged perspective view of the reticulated tube 10 illustrated in FIG. 2A.

The reticulated tube 10 is a cylindrical member in which many openings 10A (meshes) are reticulately formed. Meshes are formed in the reticulated tube 10 by forming many openings 10A. Each opening 10A (mesh) is surrounded by at least two peripheral parts 10B, and constitutes a hole penetrating in a radial direction of the reticulated tube 10.

Each peripheral part 10B is a linear (including band-shaped and string-shaped) section that surrounds the opening 10A. The peripheral part 10B is present between the opening 10A and the opening 10A. The peripheral part 10B may be referred to as a "strand". A branch part 10C is formed in a boundary of three or more openings 10A. Three or more peripheral parts 10B extend from the branch part 10C. In a case of the reticulated tube 10 illustrated in FIG. 2A, the branch part 10C is formed in a boundary of four openings 10A, and four peripheral parts 10B extend from the branch part 10C. The branch part 10C may be referred to as a "bridge".

In one or more embodiments, a plurality of first wires 11 formed in a spiral shape in a predetermined direction (S direction) and a plurality of second wires 12 formed in a spiral shape in a reverse direction (Z direction) of the first wires 11 form the reticulated tube 10. It should be noted that four first wires 11 and four second wires 12 form the reticulated tube 10 in one or more embodiments, but the number of the first wires 11 and the second wires 12 is not limited thereto. The peripheral part 10B according to one or more embodiments is constituted by the first wire 11 or the second wire 12. The branch part 10C is constituted by an intersection point of the first wire 11 and the second wire 12. In one or more embodiments, the intersection point of the first wire 11 and the second wire 12 is bonded (i.e., the branch part 10C according to one or more embodiments is a bonding part of the first wire 11 and the second wire 12). It should be noted that, in one or more embodiments, the intersection point of the first wire 11 and the second wire 12 is fusion-bonded.

In one or more embodiments, as illustrated in FIG. 2B, the first wire 11 and the second wire 12 are bonded to each other in an overlapping manner in the branch part 10C. In other words, in one or more embodiments, the branch part 10C has a double-layer structure of the first wire 11 and the second wire 12 being bonded together, and has strength higher than that of the peripheral part 10B except for the branch part 10C having a single-layer structure of the first wire 11 or the second wire 12. Thus, in one or more embodiments, the peripheral part 10B except for the branch part 10C is more easily bent than the branch part 10C.

In one or more embodiments, as illustrated in FIG. 2B, the first wire 11 and the second wire 12 intersect each other such that the first wire 11 is disposed on the second wire 12 in the branch part 10C. In other words, in one or more embodiments, the first wire 11 and the second wire 12 are not braided. In this way, one wire of the first wire 11 and the second wire 12 is only disposed on the other wire, and thus the reticulated tube 10 can be manufactured more easily than a case where the first wire 11 and the second wire 12 are braided (a case where the first wire 11 and the second wire 12 alternately intersect each other) (described later).

Figure 3A:
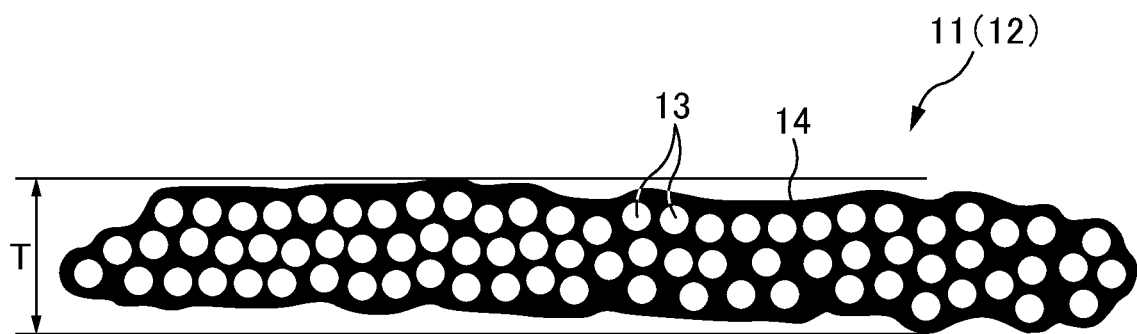
FIGS. 3A to 3C are a cross-sectional views of a first wire 11 (or a second wire 12) according to one or more embodiments.

FIG. 3A is a cross-sectional view of the first wire 11 (or the second wire 12) according to one or more embodiments. The first wire 11 (or the second wire 12) includes a plurality of core parts 13 and a sheath part 14. Each core part 13 is a fibrous member (core material) extending in the longitudinal direction (longitudinal direction of the first wire 11). The sheath part 14 is a sheath member that covers an outer periphery of the plurality of core parts 13. A melting point of the sheath part 14 is lower than a melting point of the core part 13. At the time of manufacturing of the first wire 11 (or the second wire 12) according to one or more embodiments, the first wire 11 (or the second wire 12) is formed by bundling many fibers having the core material (core part 13) covered with the sheath part 14, and integrally fusing many fibers while extending many fibers at a temperature higher than or equal to the melting point of the sheath part 14 and lower than the melting point of the core part 13. At the time of manufacturing of the reticulated tube 10, both the first wire 11 and the second wire 12 are heat-sealed in the intersection point of the first wire 11 and the second wire 12 by being heated at a temperature higher than or equal to the melting point of the sheath part 14 and lower than the melting point of the core part 13. Since the melting point of the core part 13 is higher than the melting point of the sheath part 14, the core part 13 can be less likely to be melted even when the sheath part 14 is heated to higher than or equal to the melting point of the sheath part 14, and thus strength of the first wire 11 and the second wire 12 after fusion splicing can be maintained.

It should be noted that the first wire 11 and the second wire 12 may be constituted by a single material instead of a composite material of a high-melting point material (core part 13) and a low-melting point material (sheath part 14) as illustrated in FIG. 3A.

Figure 3B:
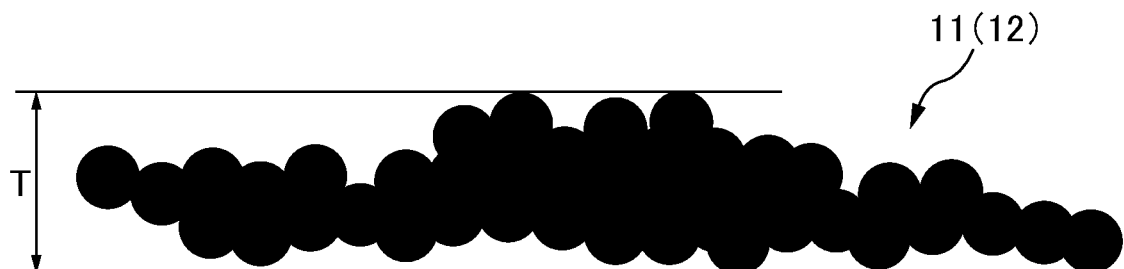
Figure 3C:

FIGS. 3B and 3C are cross-sectional views of the first wire 11 (or the second wire 12) having a different structure. The first wire 11 illustrated in FIG. 3B is formed by integrally fusing fibers formed of a core material without a sheath. The first wire 11 illustrated in FIG. 3C is formed in a film shape instead of fusing a fibrous member. The first wire 11 (or the second wire 12) may be similarly constituted by a single material. In the following description, the structure illustrated in FIG. 3A may be referred to as a "double-layer monofilament", the structure illustrated in FIG. 3B may be referred to as a "single-layer monofilament", and the structure illustrated in FIG. 3C may be referred to as a "film".

As described later, it is desirable that the first wire 11 (or the second rod 12) has plasticity. In this way, the reticulated tube 10 can be constituted such that the peripheral part 10B has shape retention in a bent state. It should be noted that, when the first wire 11 and the second wire 12 are constituted by a double-layer monofilament in which, for example, the core part 13 is polyester and the sheath part 14 is polypropylene, the reticulated tube 10 can be constituted such that the peripheral part 10B has shape retention in a bent shape. However, as long as the reticulated tube 10 can be constituted such that the peripheral part 10B has shape retention in a bent state, a material of the first wire 11 (and the second wire 12) is not limited thereto. The first wire 11 (and the second wire 12) may be constituted by another organic material by, for example, using a material other than polyester for the core part 13 and using a material other than polypropylene for the sheath part 14. The first wire 11 (and the second wire 12) may not be constituted by a double-layer monofilament, and may be constituted by a material other than an organic material.

In one or more embodiments, the peripheral part 10B is formed in a tape shape (a band shape and a flat shape) as illustrated in FIGS. 3A to 3C. In this way, in one or more embodiments, the peripheral part 10B is easily bent such that a mountain fold and a valley fold are formed on a tape surface. It should be noted that, as described later, when the peripheral part 10B is constituted by a member acquired by integrally fusing fibers as illustrated in FIGS. 3A and 3B, the peripheral part 10B is more easily bent than a case where the peripheral part 10B is formed in a film shape illustrated in FIG. 3C. As a result, the reticulated tube 10 can more greatly contract.

Figure 4A:
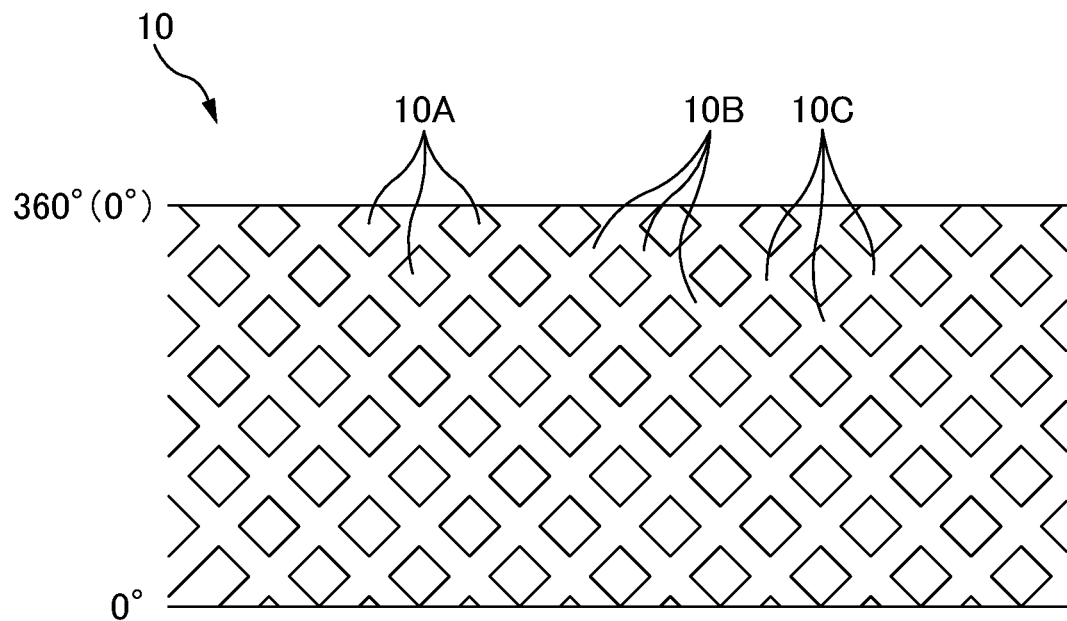
FIG. 4A is a developed view for illustrating another shape of the reticulated tube 10 according to one or more embodiments.
Figure 4B:
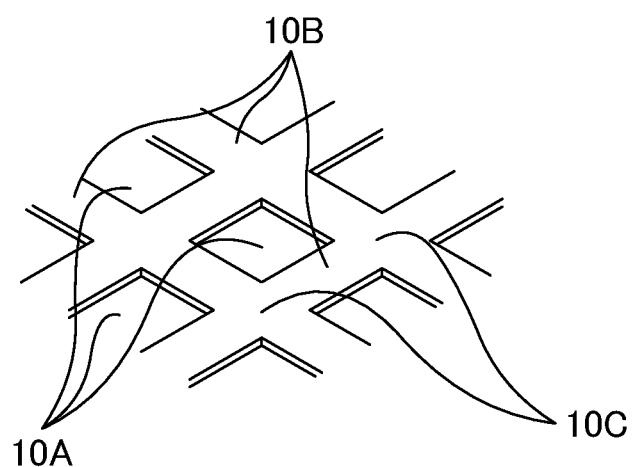
FIG. 4B is an enlarged perspective view of the reticulated tube 10 illustrated in FIG. 4A.

FIG. 4A is a developed view for illustrating another shape of the reticulated tube 10. FIG. 4B is an enlarged perspective view of the reticulated tube 10 illustrated in FIG. 4A. The above-described reticulated tube 10 is constituted by bonding the first wire 11 and the second wire 12 together (cf. FIGS. 2A and 2B), whereas the reticulated tube 10 here is constituted as one cylindrical member in which many openings 10A are formed. In this way, an intersection point of two linear peripheral parts 10B may not be bonded (the branch part 10C may not be a bonding part).

Figure 5A:
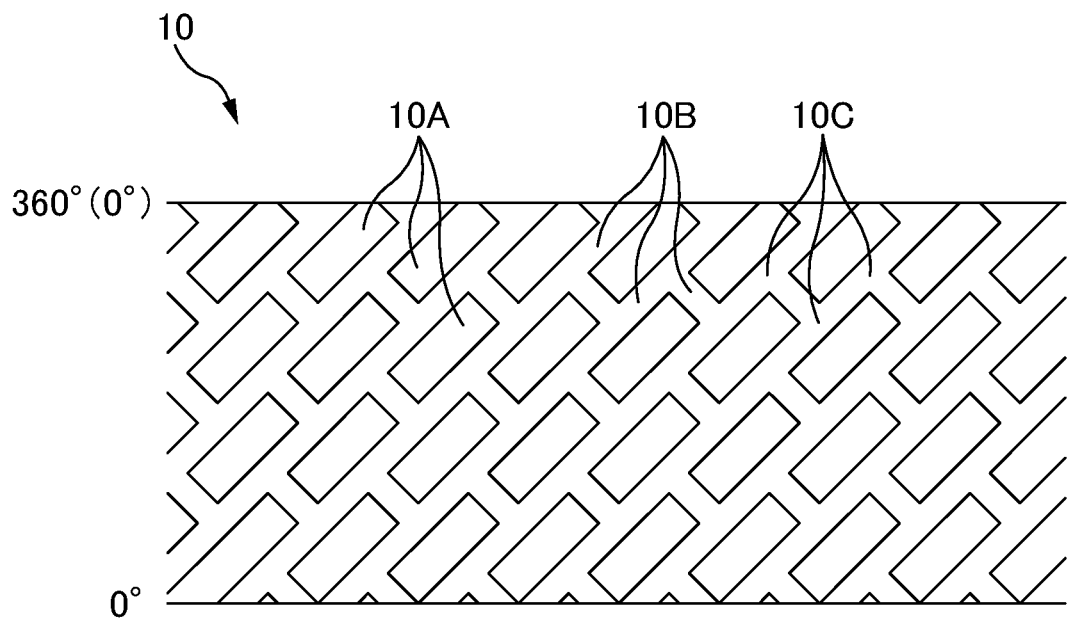
FIGS. 5A and 5B are developed views for illustrating still another shape of the reticulated tube 10 according to one or more embodiments.
Figure 5B:
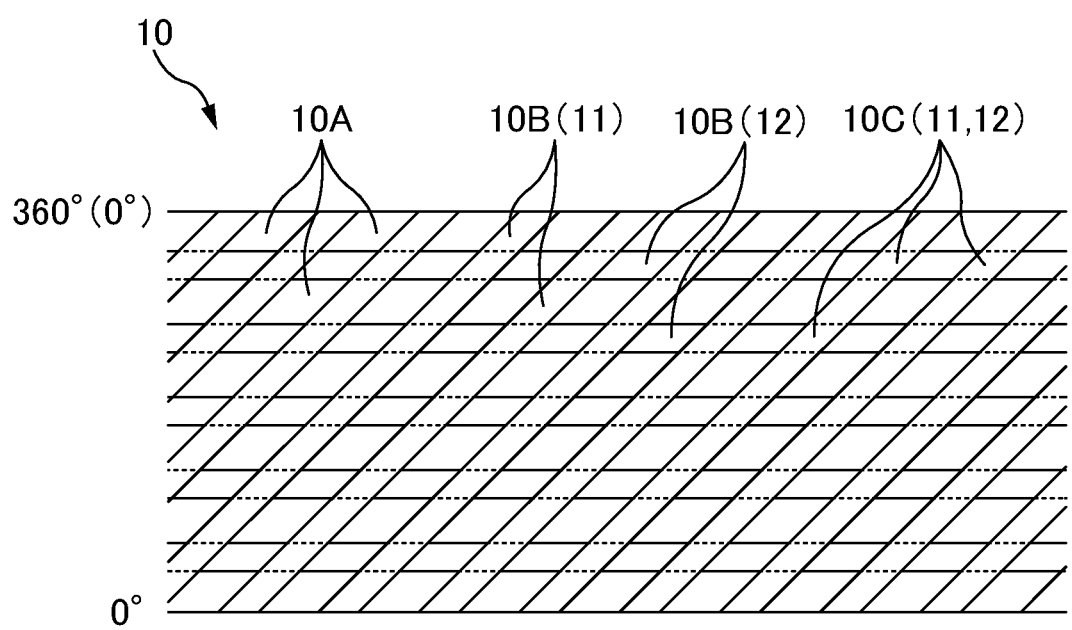

FIGS. 5A and 5B are developed views for illustrating still another shape of the reticulated tube 10. In the reticulated tube 10 described above, two linear peripheral parts 10B intersect each other in the branch part 10C (cf. FIGS. 2B and 4B), and four peripheral parts 10B extend from the branch part 10C, whereas in the reticulated tube 10 illustrated in FIG. 5A, the linear peripheral parts 10B do not intersect each other, and three peripheral parts 10B extend in a T shape from the branch part 10C. In this way, two linear peripheral parts 10B may not intersect each other. In the reticulated tube 10 illustrated in FIG. 5B, a plurality of first wires 11 formed in a spiral shape in a predetermined direction (S direction) and a plurality of second wires 12 disposed along the longitudinal direction (aligned vertically) form the reticulated tube 10. In this way, when the reticulated tube 10 is formed by bonding an intersection point of two wires, all wires may not be disposed in a spiral shape. It should be noted that, when the reticulated tube 10 includes wires parallel to the longitudinal direction as in the reticulated tube 10 illustrated in FIG. 5B, an inner diameter of the reticulated tube 10 becoming extremely thin during extension of the reticulated tube 10 can be suppressed.

It should be noted that a shape of the opening 10A may not be a square and a rectangle, and may be a rhombus and a parallelogram. A shape of the opening 10A may not be a quadrilateral, and may be another polygon. A shape of the opening 10A is not limited to a polygon, and may be a circle and an ellipse. The opening 10A may be formed in a slit shape having no predetermined area.

FIG. 6A is an explanatory diagram of a shape of a braided tube according to a comparative example. FIG. 6B is an enlarged explanatory diagram of the vicinity of a mesh of the braided tube according to the comparative example.

The braided tube according to the comparative example is formed by braiding wires into a tube shape. Since an intersection point of the wires is not bonded, an angle at which the wires intersect each other is variable. In a case of such a braided tube, the wires extend and contract in the longitudinal direction by changing an intersection angle of the wires without bending the wires. Thus, the amount of extension and contraction of the braided tube in the longitudinal direction is relatively small. In a case of the braided tube, an intersection angle of the wires changes for extension and contraction, and thus a diameter of a tube changes. Thus, when the braided tube is extended, an inner diameter of the braided tube becomes thin, and thus pressure is applied to the optical fibers 5 inserted through the inside, and a transmission loss of the optical fibers 5 may increase.

Figure 7A:
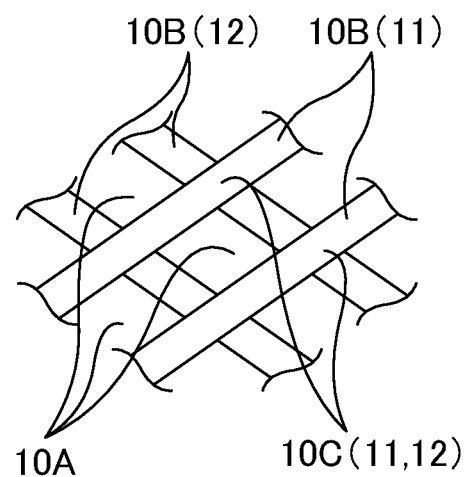
FIGS. 7A and 7B are explanatory diagrams of a state before and after extension and contraction in the vicinity of an opening 10A (mesh) of the reticulated tube 10 according to one or more embodiments.
Figure 7B:
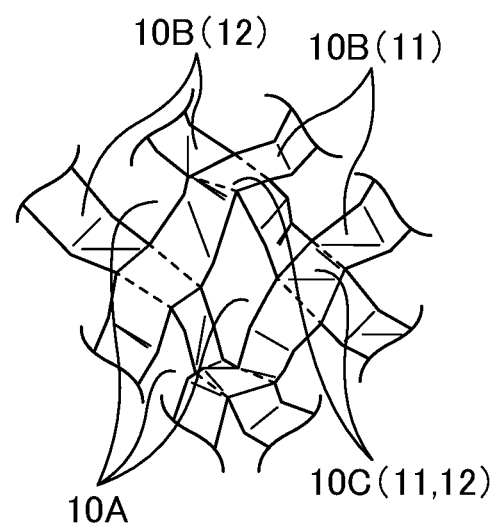

FIGS. 7A and 7B are explanatory diagrams of a state before and after extension and contraction in the vicinity of the opening 10A (mesh) of the reticulated tube 10 according to one or more embodiments.

In one or more embodiments, when the reticulated tube 10 contracts in the longitudinal direction (cf. FIG. 1B), as illustrated in FIG. 7B, the peripheral part 10B of the opening 10A is bent and folded in the longitudinal direction. The reason is that, in one or more embodiments, the peripheral part 10B is restricted by the branch part 10C, and an intersection angle of the wires is not variable as in the comparative example (the reason is that the first wire 11 and the second wire 12 are bonded together at an intersection point in one or more embodiments). The bent peripheral part 10B is not only displaced within a cylindrical peripheral surface of the reticulated tube 10 before deformation, but is also displaced in a radial direction. As a result, in one or more embodiments, the amount of contraction in the longitudinal direction greatly increases further than that of the braided tube according to the comparative example. As described later, in one or more embodiments, a length of the reticulated tube 10 after contracting in the longitudinal direction can be less than or equal to 10% of a length of the reticulated tube 10 in an initial state (extended state) before the contraction (in contrast, the braided tube according to the comparative example illustrated in FIG. 6B cannot contract to a 1/10 length in an initial state in a contraction mechanism of the braided tube).

In one or more embodiments, the peripheral part 10B is restricted by the branch part 10C, and an intersection angle of the wires is not variable in contrast to the comparative example, and thus an inner diameter of the reticulated tube 10 excessively becoming thin when the reticulated tube 10 is extended can be suppressed. Thus, when the reticulated tube 10 in a folded state is extended, pressure applied to the optical fibers 5 inserted through the inside can be suppressed, and a transmission loss of the optical fibers 5 can be suppressed.

It should be noted that, in order to suppress an inner diameter of the reticulated tube 10 from excessively becoming thin during extension of the reticulated tube 10, it is desirable that two or more branch parts 10C that restrict the peripheral parts 10B are present on the section of the reticulated tube 10 (on the cross section of the reticulated tube 10 in a section in which the branch part 10C is present (e.g., when the cross section of the reticulated tube 10 intersects the branch part 10C). When three or more branch parts 10C that restrict the peripheral parts 10B are present on the cross section of the reticulated tube 10, a polygonal space with the plurality of branch parts 10C as vertexes on the cross section can be held, and thus pressure applied to the optical fibers 5 disposed in the space can be suppressed, which is especially desirable. It should be noted that, since four branch parts 10C are present on the cross section of the reticulated tube 10 in one or more embodiments, an inner diameter of the reticulated tube 10 excessively becoming thin can be suppressed, and pressure applied to the optical fibers 5 inserted through the inside can also be suppressed.

Since the peripheral part 10B is formed in a tape shape (a band shape and a flat shape) (cf. FIG. 3A) in one or more embodiments, the peripheral part 10B is easily bent such that a mountain fold and a valley fold are formed on a tape surface. Thus, the bent peripheral part 10B is more likely to be displaced in the radial direction, and the amount of contraction in the longitudinal direction can extremely increase. In addition, since strength of the peripheral part 10B (single-layer structure) except for the branch part 10C is lower than that of the branch part 10C (double-layer structure) in one or more embodiments, the peripheral part 10B can be guided to be bent such that a mountain fold and a valley fold are formed on a tape surface (such that a tape surface is displaced in the radial direction) when the reticulated tube 10 is folded in the longitudinal direction.

In one or more embodiments, the peripheral part 10B has plasticity, is plastically deformed in a bent state of the peripheral part 10B, and is held in a bent shape. In other words, in one or more embodiments, the peripheral part 10B has shape retention in a bent state. In this way, in one or more embodiments, a shape of the reticulated tube 10 can be held in a state in which the reticulated tube 10 contracts in the longitudinal direction as illustrated in FIG. 1B. In one or more embodiments, the peripheral part 10B in a bent state can be extended to an original state. In this way, in one or more embodiments, the reticulated tube 10 can be extended in the longitudinal direction as illustrated in FIG. 1A from a state in which the reticulated tube 10 is contracted in the longitudinal direction (cf. FIG. 1B). It should be noted that, in one or more embodiments, work for inserting the optical fibers 5 through the reticulated tube 10 is facilitated by using the property of extending the peripheral part 10B in a bent state to an original state.

Figure 8:
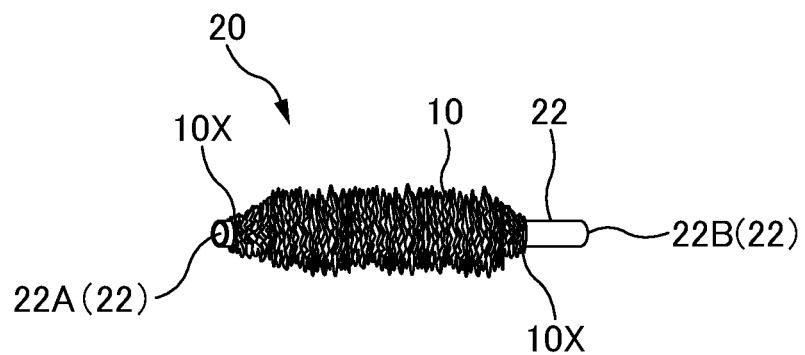
FIG. 8 is an explanatory diagram of a protective unit 20 according to one or more embodiments.

Protective Unit 20:

FIG. 8 is an explanatory diagram of a protective unit 20.

The protective unit 20 is a member for inserting the optical fibers 5 through the reticulated tube 10. The protective unit 20 includes the reticulated tube 10 described above and a tubular member 22 (pipe). The tubular member 22 is a hollow cylindrical member, and is configured to be inserted with a bundle of the plurality of optical fibers 5 through the tubular member. In the following description, one end part of the tubular member 22 may be referred to as a "first end 22A", and the other end part may be referred to as a "second end 22B". The reticulated tube 10 folded in the longitudinal direction is disposed on an outer periphery of the tubular member 22. The tubular member 22 is inserted through the folded reticulated tube 10. In other words, the protective unit 20 has a double-tube structure in which the tubular member 22 is disposed inside and the folded reticulated tube 10 is disposed on the outer periphery. The tubular member 22 is disposed inside the reticulated tube 10, and thus an end part 5A of the optical fiber 5 is not caught on the reticulated tube 10 when the optical fibers 5 are inserted through the reticulated tube 10. It should be noted that, since a bundle of the plurality of optical fibers 5 are inserted through the folded reticulated tube 10 (described later) in one or more embodiments, it is especially advantageous to dispose the tubular member 22 inside the reticulated tube 10.

The reticulated tube 10 is folded in the longitudinal direction so as to have a length shorter than a length of the tubular member 22 in the longitudinal direction. The first end 22A and the second end 22B of the tubular member 22 extend from the end parts 10X on both sides of the folded reticulated tube 10. The first end 22A and the second end 22B of the tubular member 22 extend outward to the left and right from the reticulated tube 10, and thus work for inserting the optical fibers 5 through the tubular member 22 is facilitated (described later). However, an end part (for example, the first end 22A) on one side of the tubular member 22 may extend outward from the reticulated tube 10, and an end part (for example, the second end 22B) on an opposite side may be disposed inside the reticulated tube 10.

The reticulated tube 10 in an extended state has a length several times as long as a length of the tubular member 22. It should be noted that, as described later, a length of the reticulated tube 10 after contracting in the longitudinal direction is less than or equal to 10% of a length of the reticulated tube 10 in an initial state (extended state) before the contraction.

The end part 10X of the folded reticulated tube 10 may be fixed or may not be fixed to the tubular member 22. It is possible that one end part 10X is fixed to the tubular member 22, and the other end part 10X is not fixed to the tubular member 22. The end part 10X of the reticulated tube 10 may be temporarily fixed to the tubular member 22 such that the end part 10X can be removed from the tubular member 22.

FIGS. 9A to 9D are explanatory diagrams of a method for manufacturing the protective unit 20.

Figure 9A:
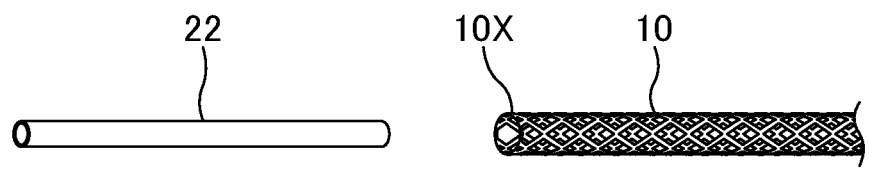
FIGS. 9A to 9D are explanatory diagrams of a method for manufacturing the protective unit 20 according to one or more embodiments.
Figure 9B:
Figure 9C:
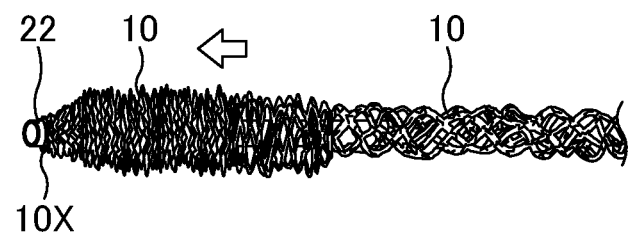
Figure 9D:
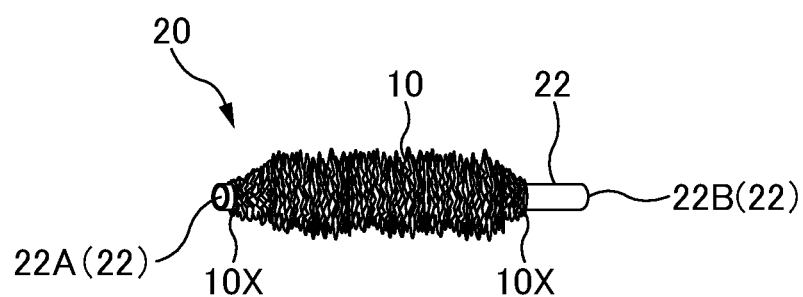

First, as illustrated in FIG. 9A, the reticulated tube 10 and the tubular member 22 are prepared. Next, as illustrated in FIG. 9B, the tubular member 22 is inserted into the reticulated tube 10, and the end part 10X (the end part 10X on a side from which the tubular member 22 is inserted) of the reticulated tube 10 is fixed (including temporal fixing) to the tubular member 22. Next, as illustrated in FIG. 9C, the reticulated tube 10 is folded in the longitudinal direction (the reticulated tube 10 contracts in the longitudinal direction) by pulling the reticulated tube 10 toward the fixed end of the reticulated tube 10. In this way, the folded reticulated tube 10 can be disposed on the outer periphery of the tubular member 22. Then, as illustrated in FIG. 9D, the reticulated tube 10 is folded in the longitudinal direction and contracts until the end part 10X on the opposite side of the reticulated tube 10 is located on the outer periphery of the tubular member 22. In this way, the protective unit 20 illustrated in FIG. 8 can be manufactured.

FIGS. 10A to 10E are explanatory diagrams of a method for laying the optical fibers 5 by using the protective unit 20. It should be noted that, FIGS. 10A to 10E are also explanatory diagrams of a method for protecting the optical fibers 5 by using the reticulated tube 10.

Figures 10A, 10B, 10C, 10D, 10E:
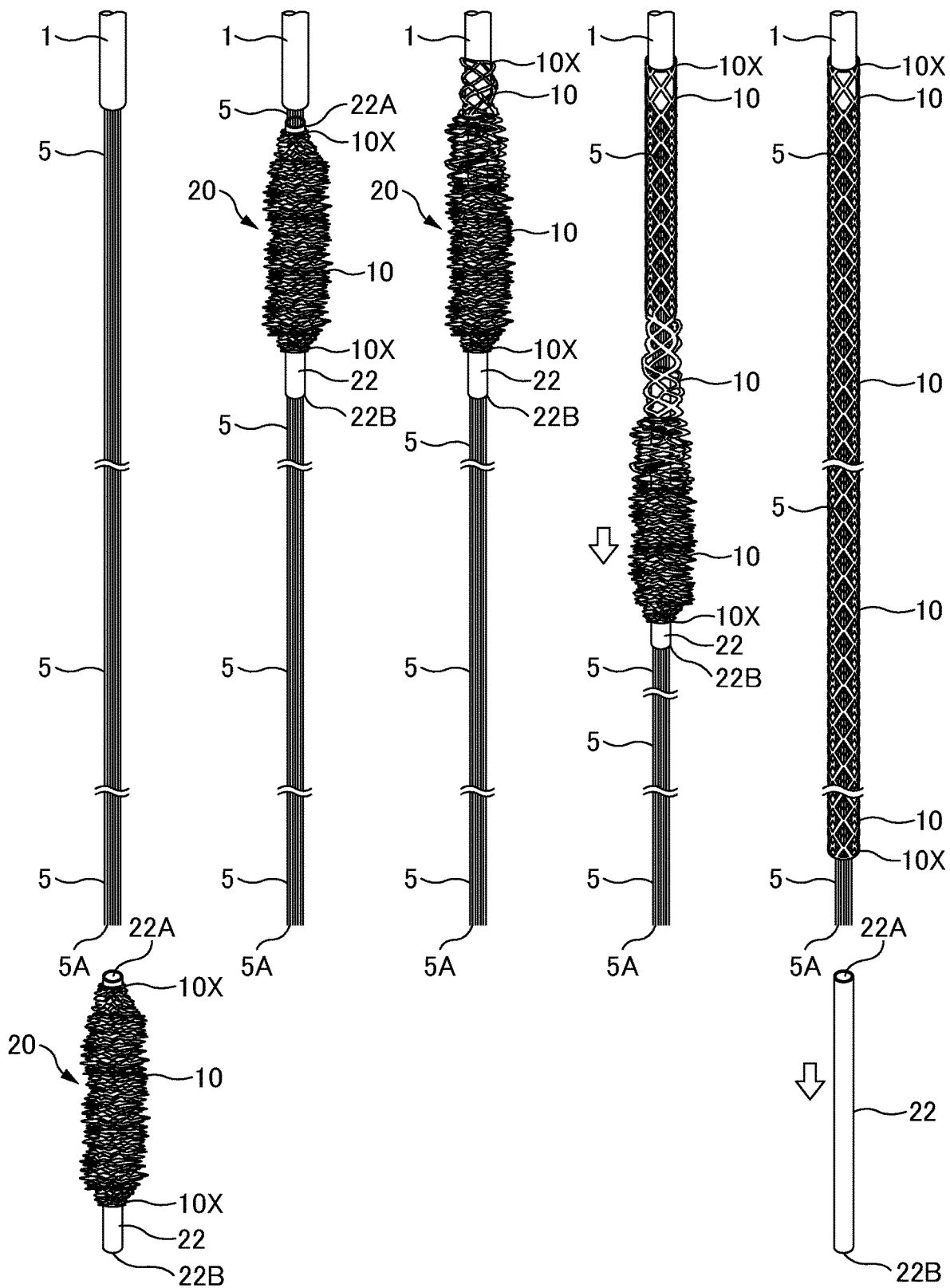
FIGS. 10A to 10E are explanatory diagrams of a method for laying optical fibers 5 by using the protective unit 20 according to one or more embodiments.

First, an operator prepares the protective unit 20 and the optical fibers 5 to be protected. Here, the plurality of optical fibers 5 (bundle of the optical fibers 5) are led from an optical cable 1. As illustrated in FIG. 10A, the operator inserts the end part 5A of the bundle of the optical fibers 5 into the first end 22A of the tubular member 22. At this time, when the end part 10X of the reticulated tube 10 is fixed to the tubular member 22 by temporal fastening, the end part 10X of the reticulated tube 10 coming off the tubular member 22 is prevented from blocking an opening of the first end 22A, and thus work for inserting the optical fibers 5 into the tubular member 22 is facilitated.

Next, the operator slides the protective unit 20 toward a lead part (peeling edge) of the optical cable 1 while inserting the optical fibers 5 through the tubular member 22 of the protective unit 20, and causes the first end 22A of the tubular member 22 of the protective unit 20 to reach the vicinity of the lead part (peeling edge) of the optical cable 1 as illustrated in FIG. 10B. The optical fibers 5 can be inserted through the folded reticulated tube 10 by inserting the optical fibers 5 through the tubular member 22, and thus the optical fibers 5 (end parts 5A of the optical fibers 5) are not caught on the reticulated tube 10. Thus, work for inserting the optical fibers 5 through the reticulated tube 10 is easier than that when the optical fibers 5 are directly inserted through the reticulated tube 10. Since the end part 10X of the reticulated tube 10 is located on the outer periphery of the tubular member 22 in one or more embodiments, the end part 10X of the reticulated tube 10 coming off the tubular member 22 is prevented from blocking an opening of the second end 22B, and thus work for pulling the optical fibers 5 out of the second end 22B side of the tubular member 22 is also easy.

Incidentally, in one or more embodiments, the reticulated tube 10 is folded in the longitudinal direction by bending the peripheral part 10B of the opening 10A (cf. FIG. 7B), the amount of contraction in the longitudinal direction of the reticulated tube 10 is extremely great (see FIGS. 1B and 9D). Therefore, in one or more embodiments, a length of the reticulated tube 10 and a length of the protective unit 20 are sufficiently shorter than a length of the optical fibers 5 to be protected. As a result, immediately after the end parts 5A of the optical fibers 5 are inserted into the first end 22A of the tubular member 22 as illustrated in FIG. 10A, the end parts 5A of the optical fibers 5 come out of the second end 22B of the tubular member 22. Thus, when the protective unit 20 slides toward the lead part (peeling edge) of the optical cable 1 (when the state in FIG. 10A is changed to the state in FIG. 10B), the operator can hold the optical fibers 5 (optical fibers 5 on the end part 5A side) coming out of the second end 22B of the tubular member 22 with a hand, and can move the reticulated tube 10 and the tubular member 22 while pulling the optical fibers 5. In this way, in one or more embodiments, work for moving the reticulated tube 10 and the tubular member 22 to a root of the optical fibers 5 (in this case, the lead part (peeling edge) of the optical cable 1) is easy. It should be noted that, if optical fibers to be protected are inserted through a protective tube (for example, a long silicon tube) having about the same length as that of the optical fibers, it takes a long time for the optical fibers to come out of an outlet of the protective tube, and thus work for covering the root of the optical fibers 5 with the protective tube (work for inserting the optical fibers through the protective tube) is difficult. In contrast, in one or more embodiments, the optical fibers 5 may be inserted through the reticulated tube 10 and the tubular member 22 that are short by using the reticulated tube 10 having an extremely great amount of contraction in the longitudinal direction, and thus workability can be improved.

Next, the operator removes the temporarily fixed end part 10X of the reticulated tube 10 from the tubular member 22, and, as illustrated in FIG. 10C, the operator pulls out the end part 10X further to the outside than the first end 22A of the tubular member 22, and covers the lead part (peeling edge; sheath) of the optical cable 1 with the end part 10X and fixes the end part 10X. A method for fixing the end part 10X of the reticulated tube 10 to the optical cable 1 may be fixing with an adhesive tape and may be fixing by using a jig.

After the end part 10X of the reticulated tube 10 is fixed to the optical cable 1, the operator slides the tubular member 22 toward the end parts 5A of the optical fibers 5 as illustrated in FIG. 10D. At this time, since the optical fibers 5 passes through the tubular member 22 and the end part 10X of the reticulated tube 10 is also fixed to the outside (in this case, the lead part of the optical cable 1), the reticulated tube 10 is pulled out of the first end 22A of the tubular member 22. As a result, the reticulated tube 10 in a folded state is extended, and, as illustrated in FIG. 1A, the bundle of the optical fibers is inserted through an extended section of the reticulated tube 10.

Lastly, as illustrated in FIG. 10E, the operator slides the tubular member 22 to the outside further than the end parts 5A of the optical fibers 5, and removes the tubular member 22 from the bundle of the optical fibers 5. Here, the temporarily fixed end part 10X of the reticulated tube 10 is removed from the tubular member 22, and the tubular member 22 and the reticulated tube 10 are separated.

However, the end part 10X of the reticulated tube 10 and the tubular member 22 may be fixed together. In this case, the tubular member 22 may not be removed from the optical fibers 5, and the optical fibers 5 may continue to be inserted through the tubular member 22.

FIGS. 11A to 11D are explanatory diagrams of another method for laying the optical fibers 5 by using the protective unit 20. It should be noted that, FIGS. 11A to 11D are also explanatory diagrams of a method for protecting the optical fibers 5 by using the reticulated tube 10.

First, an operator prepares the protective unit 20. Here, the end part 10X (first end; fixed end) on the left side in the diagram of the reticulated tube 10 of the protective unit 20 is fixed (for example, bonded) to the tubular member 22. On the other hand, the end part 10X (second end; free end) on the right side in the diagram of the folded reticulated tube 10 is not fixed to the tubular member 22. Thus, the end part 10X (second end; free end) on the right side in the diagram of the reticulated tube 10 can slide and move on the outside of the tubular member 22 in the longitudinal direction, and the tubular member 22 can also be removed. On the other hand, the end part 10X on the left side in the diagram of the reticulated tube 10 is fixed to the tubular member 22, and is thus prevented from coming out of the tubular member 22. In this way, the end part 10X of the reticulated tube 10 can be prevented from blocking the first end 22A (end part of the tubular member 22 on a side on which the fixed end (first end) of the reticulated tube 10 is present) of the tubular member 22. However, the end parts 10X on both sides of the reticulated tube 10 may be free ends without being fixed to the tubular member 22.

Figure 11A:
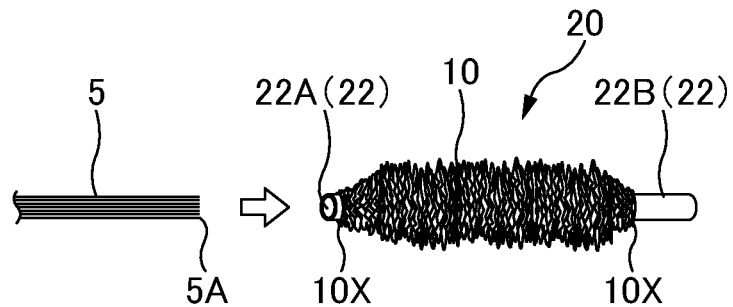
FIGS. 11A to 11D are explanatory diagrams of another method for laying the optical fibers 5 by using the protective unit 20 according to one or more embodiments.

As illustrated in FIG. 11A, the operator inserts a bundle of the optical fibers 5 from the first end 22A (end part of the tubular member 22 on the side on which the fixed end (first end) of the reticulated tube 10 is present) of the tubular member 22. At this time, since the end part 10X of the reticulated tube 10 is fixed, the end part 10X is prevented from blocking an opening (end part of the tubular member 22 on the side on which the fixed end (first end) of the reticulated tube 10 is present) of the first end 22A of the tubular member 22. Thus, work for inserting the optical fibers 5 into the tubular member 22 is easy.

Figure 11B:
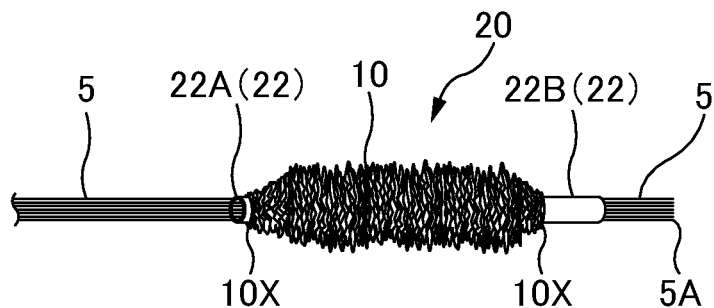

Next, as illustrated in FIG. 11B, the operator pulls the end parts 5A of the optical fibers 5 out of the second end 22B (end part of the tubular member 22 on the side on which the free end (second end) of the reticulated tube 10 is present) on an opposite side of the tubular member 22. At this time, the optical fibers 5 can be inserted through the folded reticulated tube 10 by inserting the optical fibers 5 through the tubular member 22, and thus the end parts 5A of the optical fibers 5 are not caught on the reticulated tube 10. Thus, work for inserting the optical fibers 5 through the reticulated tube 10 is easier than that when the optical fibers 5 are directly inserted through the reticulated tube 10. Since the free end (second end) of the reticulated tube 10 is located on the outer periphery of the tubular member 22 in one or more embodiments, the end part 10X of the reticulated tube 10 does not block the opening of the second end 22B of the tubular member 22, and thus work for pulling the optical fibers 5 out of the tubular member 22 is also easy.

Figure 11C:
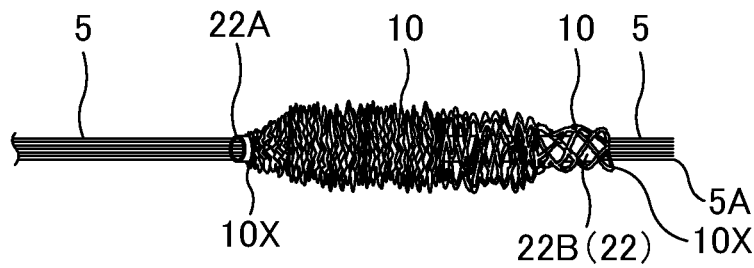
Figure 11D:
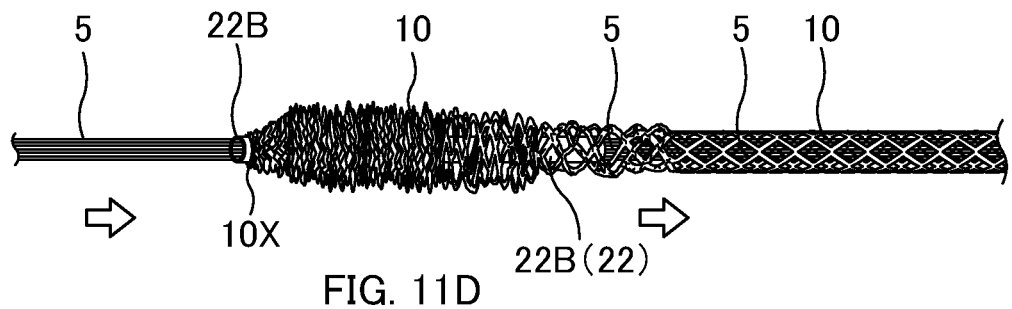

Next, as illustrated in FIG. 11C, the operator removes the end part 10X (second end; free end) of the reticulated tube 10 to the outside of the tubular member 22, and covers the bundle of the optical fibers 5 with the end part 10X of the reticulated tube 10. Then, the operator pinches the optical fibers 5 over the end part 10X of the reticulated tube 10, and, as illustrated in FIG. 11D, the operator pulls the optical fibers 5 and the reticulated tube 10 together out of the second end 22B (end part of the tubular member 22 on the side on which the free end (second end) of the reticulated tube 10 is present) of the tubular member 22. When 10X (second end; free end) of the reticulated tube 10 is pulled out of the second end 22B of the tubular member 22, the reticulated tube 10 in a folded state is extended, and, as illustrated in FIG. 1A, the bundle of the optical fibers 5 is inserted through an extended section of the reticulated tube 10. Subsequently, the operator repeats work for pinching the optical fibers 5 over the reticulated tube 10 and pulling the optical fibers 5 and the reticulated tube 10 together. In this way, the reticulated tube 10 through which the bundle of the optical fibers 5 is inserted as illustrated in FIG. 1A can be pulled out of the second end 22B of the tubular member 22. It should be noted that, since the reticulated tube 10 is constituted by a flexible material, the operator can pinch the optical fibers 5 together with the reticulated tube 10 by pinching the reticulated tube 10 on the outside further than the second end 22B of the tubular member 22, and thus work for pulling out the optical fibers 5 and the reticulated tube 10 together is easy.

Figure 12:
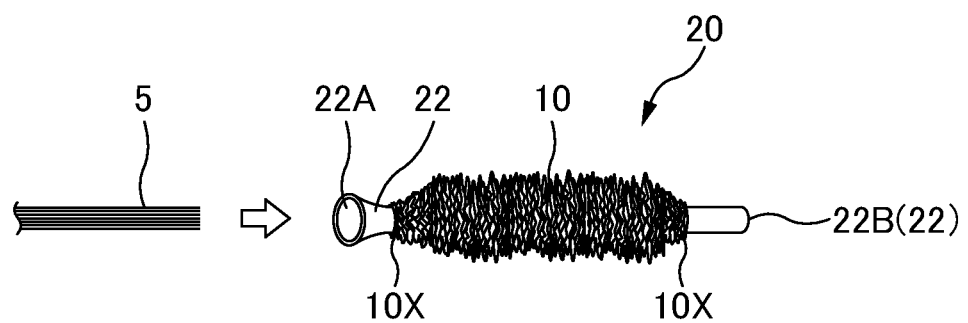
FIG. 12 is an explanatory diagram of the protective unit 20 in an improved example according to one or more embodiments.

FIG. 12 is an explanatory diagram of the protective unit 20 in an improved example. In the tubular member 22 of the protective unit 20 in the improved example, the first end 22A (end part of the tubular member 22 on the side on which the fixed end of the reticulated tube 10 is present) has a trumpet shape. In other words, the tubular member 22 of the protective unit 20 in the improved example has an opening widened toward the end part. In this way, work for inserting a bundle of the optical fibers 5 from the first end 22A of the tubular member 22 is facilitated. It should be noted that, according to the improved example, the end parts of the optical fibers 5 are less likely to contact an edge (edge of the opening) of the tubular member 22, and thus an effect of suppressing damage to the optical fibers 5 can also be achieved.

In a case of the protective unit 20 in the improved example, it is desirable that an outer diameter of the first end 22A having a widened opening is greater than an inner diameter of the reticulated tube 10 in a folded state. In this way, the end part 10X of the reticulated tube 10 can be prevented from coming out of the tubular member 22. Thus, in a case of the protective unit 20 in the improved example, both ends of the reticulated tube 10 may be free ends without fixing the end part 10X of the reticulated tube 10 to the tubular member 22.

Figure 13:
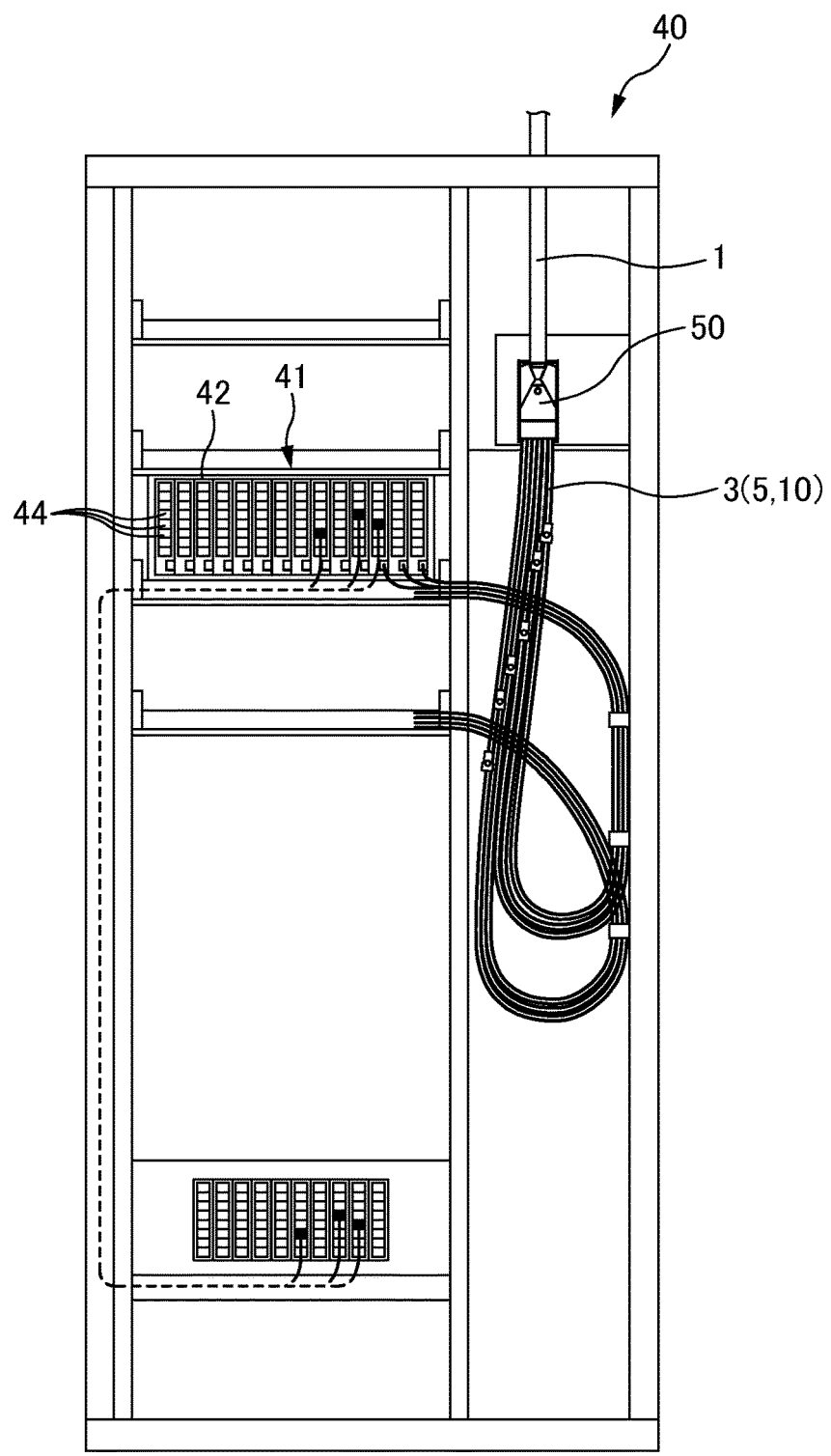
FIG. 13 is an explanatory diagram of a state in a rack 40 according to one or more embodiments.

Branch Unit: Usage Example of Protective Unit 20:

FIG. 13 is an explanatory diagram of a state in a rack 40. In the rack 40, a terminal apparatus 41 and a branch member 50 are disposed. The rack 40 is a shelf on which the terminal apparatus 41 and the like are placed, and includes a frame and a shelf plate. The terminal apparatus 41 includes a plurality of optical modules 42 aligned to the left and right, and each of the optical modules 42 includes a plurality of connector connecting ports 44 (optical adapters) aligned to the top and bottom.

The branch member 50 is a member (branch unit) that divides a plurality of bundles of the optical fibers 5 from the optical cable 1. The optical cable 1 is a cable including many optical fibers 5, and includes a plurality of bundles constituted by the plurality of optical fibers 5.

Each bundle of the optical fibers 5 divided from the branch member 50 is disposed (wired) from the branch member 50 to the terminal apparatus 41. Normally, by inserting a bundle of the optical fibers 5 through a protective tube being a long elastic tube (silicon tube) in a wiring path from the branch member 50 to the terminal apparatus 41, the optical fibers 5 are protected (in contrast, in one or more embodiments, the reticulated tube 10 protects a bundle of the optical fibers 5). It should be noted that an optical connector is attached to the end part of the optical fiber 5, and each optical connector is connected to the connector connecting port 44 of the terminal apparatus 41.

Figure 14:
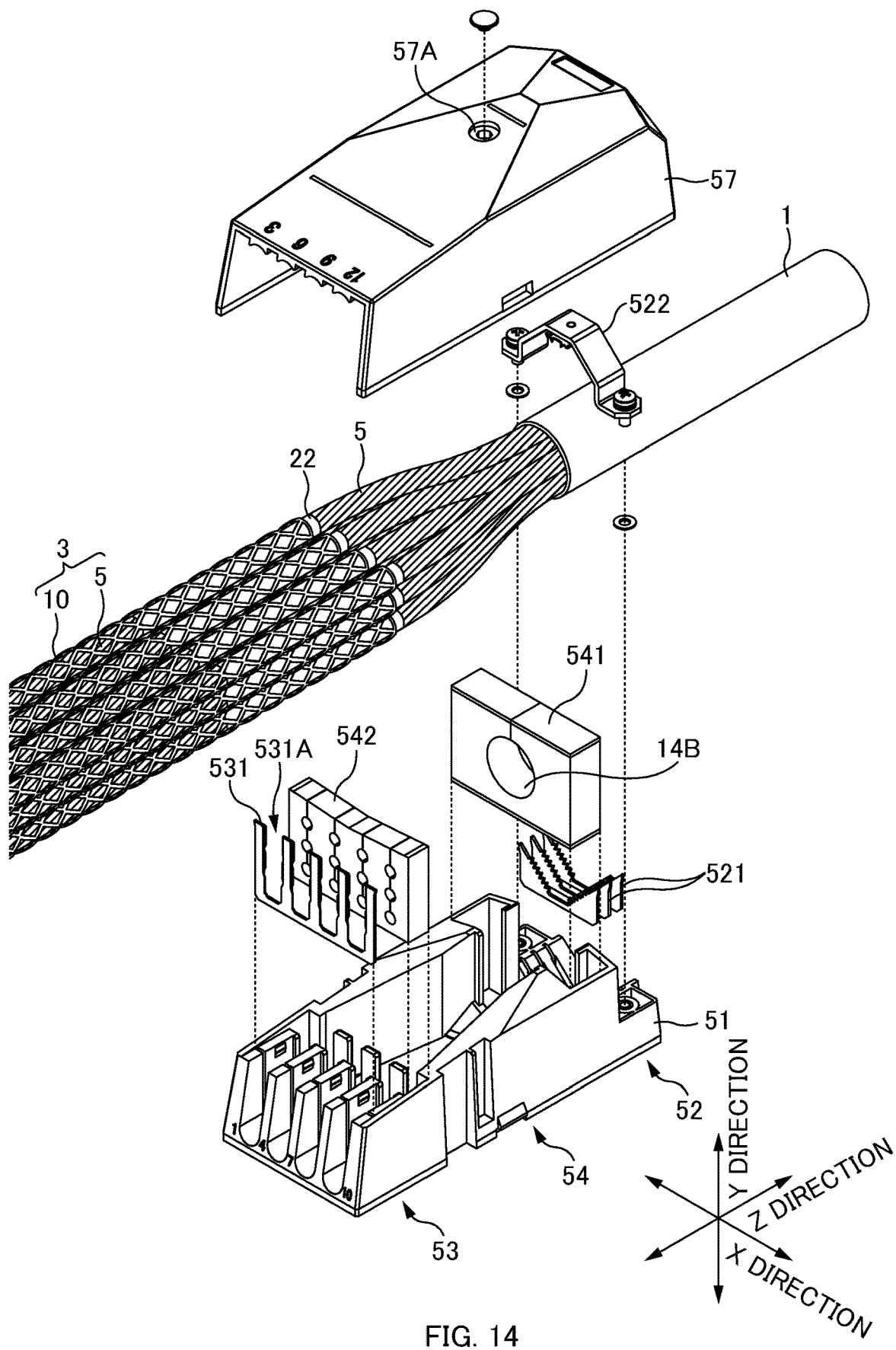
FIG. 14 is an exploded view of a branch member 50 according to one or more embodiments.

FIG. 14 is an exploded view of the branch member 50. The branch member 50 includes a body part 51 and a lid 57.

The body part 51 is a section that holds the optical cable 1 and a divided bundle of the optical fibers 5. The body part 51 includes a first fixing part 52, a second fixing part 53, and a housing part 54.

The first fixing part 52 is a section (cable fixing part) that fixes the end part of the optical cable 1. The first fixing part 52 includes a support part 521 and a fastening member 522. The support part 521 is a member that supports the optical cable 1. Here, the support part 521 is constituted by a saw teeth plate including teeth that dig into the sheath of the optical cable 1, but the support part 521 may not include the teeth. The support part 521 may be integrally formed with the body part 51. The fastening member 522 is a member that fixes the optical cable 1 between the support part 521 and the fastening member 522.

The second fixing part 53 is a section that fixes a protective tube through which the bundle of the optical fibers 5 is inserted (however, in one or more embodiments, the second fixing part 53 fixes the tubular member 22 of the protective unit 20 instead of a long protective tube). The second fixing part 53 includes a holding part 531. The holding part 531 includes a plurality of (here, four) recessed parts 531A. Three protective tubes (elastic tubes (silicon tubes)) through which the optical fibers 5 are inserted; the tubular member 22 in one or more embodiments) can be inserted into each of the recessed parts 531A. Here, the holding part 531 is constituted by a holding plate including teeth that dig into the protective tube, but the holding part 531 may be integrally formed with the body part 51. When the protective tube is inserted into the recessed part 531A of the holding part 531, the holding part 531 digs into the protective tube, and the protective tube is held by the holding part 531.

The housing part 54 is a section that houses a branch part (lead part) of the optical cable 1. The lead part of the optical cable 1 can be bonded and fixed to the branch member 50 by filling the housing part 54 with an adhesive. The adhesive is filled in the housing part 54 from an injection opening 57A of the lid 57 after the lid 57 is attached to the body part 51. In order to prevent a leakage of the adhesive, an upstream stopper 541 is located on an upstream side (optical cable 1 side) of the housing part 54, and a downstream stopper 542 is located on a downstream side of the housing part 54.

In one or more embodiments, the optical cable 1 includes 12 bundles of the optical fibers 5. In one or more embodiments, after the optical cable 1 is led out, each of the bundles of the optical fibers 5 is inserted through the reticulated tube 10 by using the protective unit 20 as illustrated in FIGS. 11A to 11D. In one or more embodiments, when the bundle of the optical fibers 5 is inserted through the reticulated tube 10 by using the protective unit 20, the tubular member 22 is disposed on the upstream side, and the optical fiber unit 3 (the bundle of the plurality of optical fibers 5 and the reticulated tube 10 through which the bundle of the optical fibers 5 is inserted) is disposed on the downstream side of the tubular member 22. FIG. 14 illustrates 12 protective units 20 each including the reticulated tube 10 through which the bundle of the optical fibers 5 is inserted.

In one or more embodiments, the tubular member 22 of the protective unit 20 can be fixed to the second fixing part 53 instead of the protective tube (silicon tube). Inserted into the recessed parts 531A of the holding part 531 are three tubular members 22 through which the bundles of the optical fibers 5 are inserted. When the tubular member 22 is inserted into the recessed part 531A of the holding part 531, the holding part 531 digs into the tubular member 22, and the tubular member 22 is held with the holding part 531.

When the protective unit 20 in one or more embodiments is used, work for inserting the optical fibers 5 (work for protecting the optical fibers 5) is easier than that when the optical fibers 5 are inserted through the protective tube being a long elastic tube. According to one or more embodiments, the tubular member 22 of the protective unit 20 can be held as it is in the second fixing part 53 of the branch member 50, which is convenient. When the holding part 531 of the second fixing part 53 holds the optical fiber unit 3, the tubular member 22 is interposed between the holding part 531 and the optical fibers 5, and thus damage to the optical fibers 5 with the holding part 531 can be suppressed.

Figure 15:
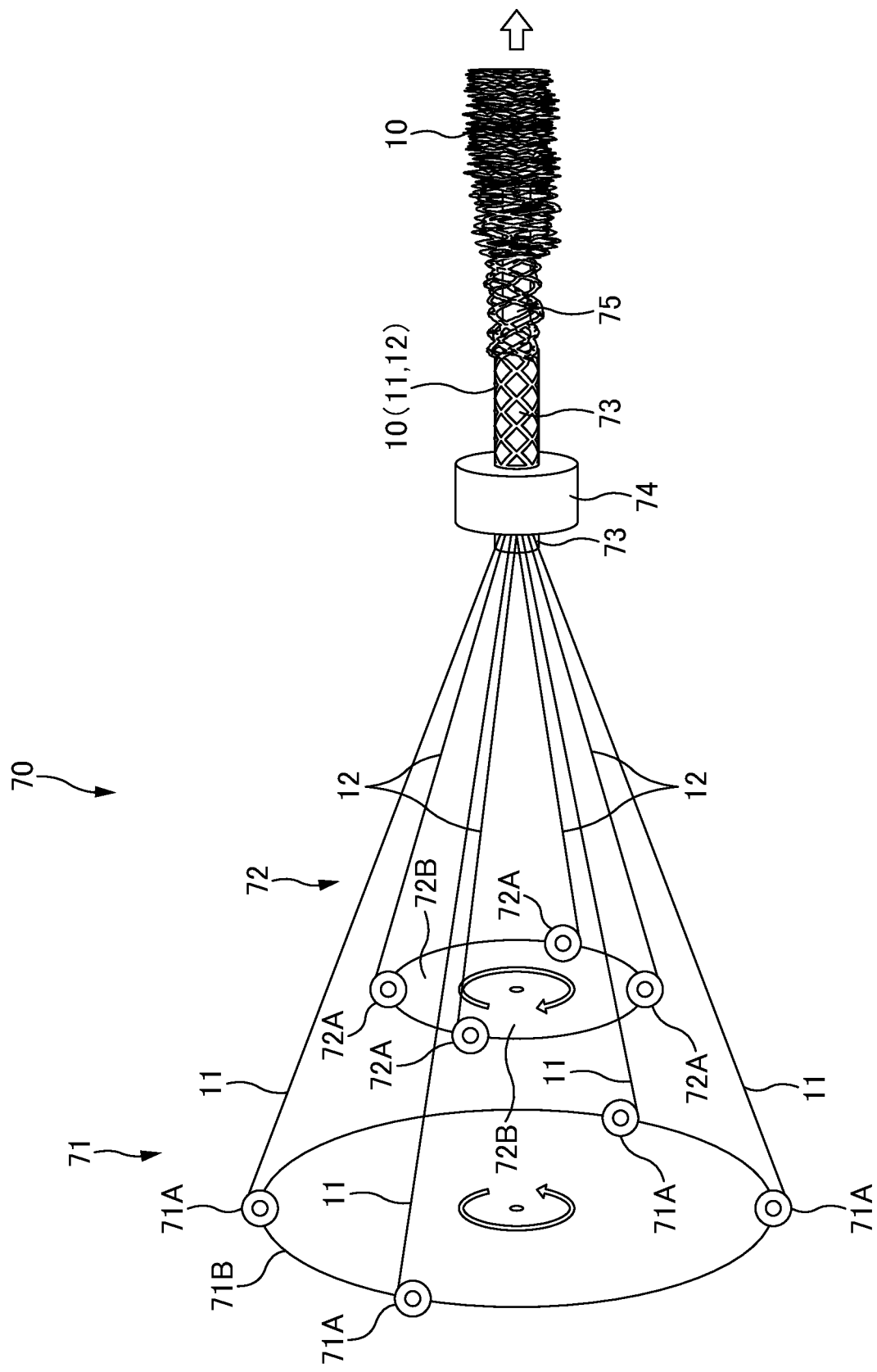
FIG. 15 is an explanatory diagram of a manufacturing device 70 of the reticulated tube 10 according to one or more embodiments.

Method for Manufacturing Reticulated Tube 10:

FIG. 15 is an explanatory diagram of a manufacturing device 70 of the reticulated tube 10. The manufacturing device 70 includes a first supply section 71, a second supply section 72, a guiding section 73, and a heating section 74. When the reticulated tube 10 folded in the longitudinal direction is manufactured, it is desirable that the manufacturing device 70 further includes a tube contracting section 75.

The first supply section 71 is a device that supplies the first wire 11 to the heating section 74. The first supply section 71 includes a plurality of first supply sources 71A and a first rotation part 71B. Each first supply source 71A is a supply source that supplies the first wire 11. The first rotation part 71B is a rotation member that rotates the plurality of first supply sources 71A in a predetermined direction. In other words, the first rotation part 71B is a member that twists the first wire 11 in the predetermined direction. In the first rotation part 71B, the plurality of first supply sources 71A are disposed at a regular interval (regular angle) in the rotation direction.

The second supply section 72 is a device that supplies the second wire 12 to the heating section 74. The second supply section 72 includes a plurality of second supply sources 72A and a second rotation part 72B. Each second supply source 72A is a supply source that supplies the second wire 12. It should be noted that the second supply source 72A has a configuration substantially the same as that of the first supply source 71A. The second rotation part 72B is a rotation member that rotates the plurality of second supply sources 72A in a reverse direction of the rotation direction of the first rotation part 71B. In other words, the second rotation part 72B is a member that twists the second wire 12 in a reverse direction of the twisting direction of the first wire 11. In the second rotation part 72B, the plurality of second supply sources 72A are disposed at a regular interval (regular angle) in the rotation direction.

The second supply section 72 is disposed on a downstream side of the first supply section 71. The second supply section 72 is disposed inside the plurality of first wires 11 supplied from the first supply section 71. In this way, an intersection point of the first wire 11 and the second wire 12 can be formed such that the first wire 11 is disposed on the second wire 12. In one or more embodiments, one wire of the first wire 11 and the second wire 12 is only disposed on the other wire, and thus the first supply section 71 and the second supply section 72 can have a simpler configuration than a case where the first wire 11 and the second wire 12 are braided (a case where the first wire 11 and the second wire 12 alternately intersect each other).

The guiding section 73 is a member that guides the first wire 11 and the second wire 12 in the longitudinal direction while winding the first wire 11 and the second wire 12. The guiding section 73 includes a columnar outer surface. The guiding section 73 may be a columnar (or stick-shaped) member and may be a cylindrical member. The first wire 11 supplied from the first supply section 71 is wound around the outer surface of the guiding section 73 in a spiral shape in a predetermined direction (S direction), and the second wire 12 supplied from the second supply section 72 is also wound around the outer surface of the guiding section 73 in a spiral shape in a reverse direction (Z direction). The first wire 11 and the second wire 12 wound around the outer surface of the guiding section 73 move in an axis direction along the columnar outer surface.

The heating section 74 is a member that heats the first wire 11 and the second wire 12. The heating section 74 heats the first wire 11 and the second wire 12, and thus an intersection point of the first wire 11 and the second wire 12 is fusion-bonded. The heating section 74 has a hollow cylindrical shape, and includes a heating surface formed on an inner surface. The guiding section 73 is inserted through the inside of the hollow heating section 74. A gap is formed between the inner surface of the heating section 74 and the outer surface of the guiding section 73, and the first wire 11 and the second wire 12 wound around the outer surface of the guiding section 73 pass through the gap. In one or more embodiments, as illustrated in FIG. 3A, the first wire 11 and the second wire 12 are constituted by the core parts 13 and the sheath part 14, and a melting point of the core parts 13 is higher than a melting point of the sheath part 14, and thus strength of the first wire 11 and the second wire 12 after fusion splicing can be maintained. The heating section 74 fusion-bonds an intersection point of the first wire 11 and the second wire 12, and thus the reticulated tube 10 is manufactured.

In one or more embodiments, an inner diameter of the reticulated tube 10 can be set by an outer diameter of the guiding section 73. A pitch of the branch parts 10C in the longitudinal direction can be set by the number of the first wires 11 and the second wires 12 (the number of the first supply sources 71A and the second supply sources 72A), a rotation speed of the first rotation part 71B and the second rotation part 72B, and a movement speed of the reticulated tube 10 in the longitudinal direction.

In one or more embodiments, the first wire 11 and the second wire 12 are wound around the outer surface of the guiding section 73, an intersection point of the first wire 11 and the second wire 12 is formed on the outer surface of the guiding section 73, and the intersection point is fusion-spliced by the heating section 74. Since the intersection point of the first wire 11 and the second wire 12 is acquired by two wires overlapping each other, the intersection point is brought closer to an inner surface (heating surface) of the heating section 74, more likely to be heated by the heating section 74, and more likely to be fusion-spliced than a section other than the intersection point. It should be noted that, in order to accelerate fusion splicing of the first wire 11 and the second wire 12, the intersection point of the first wire 11 and the second wire 12 may contact the inner surface (heating surface) of the heating section 74. In order to crimp the first wire 11 and the second wire 12, a gap between the outer surface of the guiding section 73 and the inner surface of the heating section 74 may be set greater than a thickness of the first wire 11 (or the second wire 12) and smaller than a thickness of the first wire 11 and the second wire 12 overlapping each other.

In one or more embodiments, the first wire 11 and the second wire 12 are formed in a tape shape (a band shape and a flat shape) as illustrated in FIG. 3A. Then, in one or more embodiments, the first wire 11 and the second wire 12 are wound around the guiding section 73 such that tape surfaces of the first wire 11 and the second wire 12 face the columnar outer surface of the guiding section 73. In this way, the tape surfaces of the first wire 11 and the second wire 12 are bonded together, and thus a contact area in the intersection point of the first wire 11 and the second wire 12 can be secured. Thus, the peripheral parts 10B can be sufficiently restricted by the branch part 10C (as a result, an intersection angle of the wires is not variable in contrast to the comparative example, and thus an inner diameter of the reticulated tube 10 excessively becoming thin when the reticulated tube 10 is extended can be suppressed). In one or more embodiments, there is no twist in the peripheral part 10B of the reticulated tube 10, and thus applying pressure to the optical fibers 5 inserted through the inside can be suppressed, and a transmission loss of the optical fibers 5 can be suppressed.

The tube contracting section 75 is a member that folds the reticulated tube 10 in the longitudinal direction and contracts the reticulated tube 10 in the longitudinal direction. The tube contracting section 75 is a columnar (or stick-shaped) member through which the reticulated tube 10 is inserted. The tube contracting section 75 includes a columnar outer surface. The tube contracting section 75 may be a columnar (or stick-shaped) member and may be a cylindrical member. The reticulated tube 10 moves in an axial direction along the outer surface of the tube contracting section 75. A supply speed of the reticulated tube 10 to the tube contracting section 75 is faster than a discharge speed of the reticulated tube 10 discharged from the tube contracting section 75. Thus, the reticulated tube 10 supplied to the tube contracting section 75 contracts in the axial direction on the tube contracting section 75, and is discharged in a folded state in the longitudinal direction from the tube contracting section 75. When the reticulated tube 10 contracts in the axial direction on the tube contracting section 75, the peripheral part 10B of the reticulated tube 10 is bent as illustrated in FIG. 7B from the state illustrated in FIG. 7A, and the reticulated tube 10 is folded in the longitudinal direction. It is desirable that an outer diameter of the tube contracting section 75 is slightly smaller than an outer diameter of the guiding section 73 such that the peripheral part 10B of the reticulated tube 10 is easily bent as illustrated in FIG. 7B.

The tubular member 22 is disposed on a downstream side of the tube contracting section 75 (not illustrated). Then, the reticulated tube 10 (the reticulated tube 10 folded in the longitudinal direction) discharged from the tube contracting section 75 is supplied to the tubular member 22, and the reticulated tube 10 is also cut at a predetermined length (length shorter than the tubular member 22). It should be noted that the end part 10X (cut end) of the cut reticulated tube 10 forms an insertion opening in which the plurality of optical fibers 5 can be inserted. The end part 10X of the cut reticulated tube 10 may be fixed (including temporal fixing) or may not be fixed to the tubular member 22. In this way, the protective unit 20 described above is formed.

It should be noted that the tube contracting section 75 may also serve as the tubular member 22. In this case, after the reticulated tube 10 contracts in the axial direction on the tube contracting section 75 and is folded in the longitudinal direction, the tube contracting section 75 together with the reticulated tube 10 are cut at a predetermined length, and the cut tube contracting section 75 serves as the tubular member 22 of the protective unit 20.

First Example

As a first example, a plurality of types of the reticulated tubes 10 varying in a mesh ratio were created by changing the number of the first wires 11 and the second wires 12 of the reticulated tube 10 and a spiral pitch. With an inner diameter (diameter of an inside dimension) of the reticulated tube 10 as approximately 5.3 mm, an evaluation was performed by inserting 288 optical fibers 5 (24 12-core intermittently connected optical fiber ribbons) through the reticulated tube 10.

Figure 16:
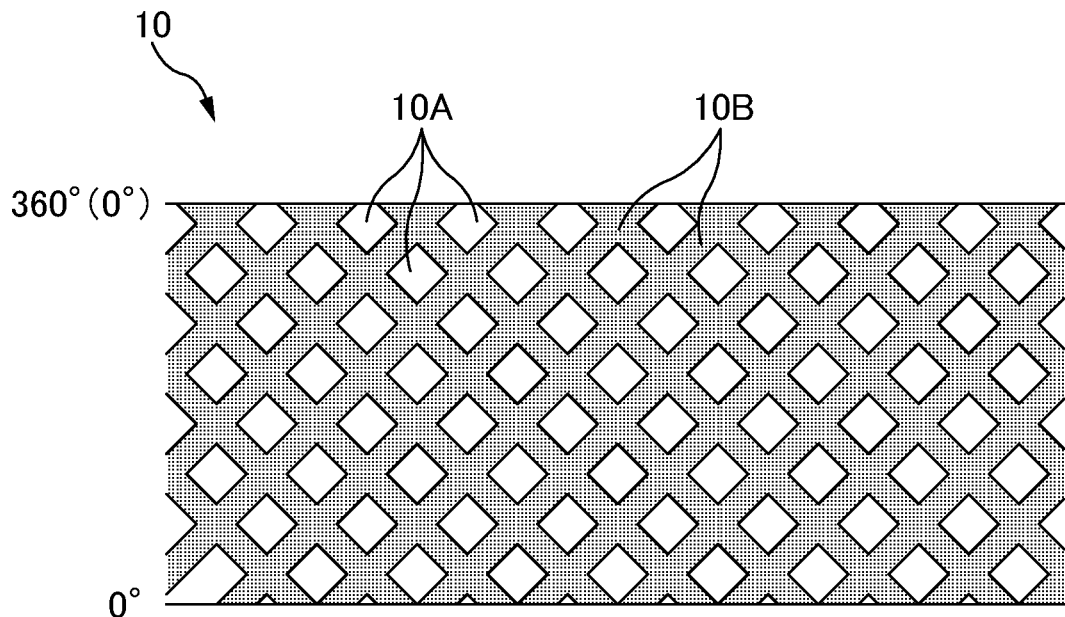
FIG. 16 is an explanatory diagram of a mesh ratio according to one or more embodiments.

FIG. 16 is an explanatory diagram of a mesh ratio. FIG. 16 is a developed view of the reticulated tube 10 similarly to FIG. 2A. A hatched section in the diagram was a section occupied by the peripheral parts 10B (the first wire 11 or the second wire 12) on a developed plane (virtual cylindrical plane of the reticulated tube 10). A section without hatching in the diagram was a section occupied by the openings 10A (mesh) on the developed plane (virtual cylindrical plane of the reticulated tube 10). Here, the mesh ratio referred to a ratio of an area occupied by the openings 10A on the developed plane to a total area (sum of the area occupied by the openings 10A and an area occupied by the peripheral parts 10B) of the reticulated tube on the developed plane. In other words, when the area occupied by the openings 10A on the developed plane was S1 and the area occupied by the peripheral parts 10B on the developed plane was S2, a mesh ratio R (%) was as in the following equation.

$$R\ (\%) = S1/(S1+S2) \times 100$$

It should be noted that a method for measuring the area S1 and the area S2 was as follows. First, four test pieces were sampled at a regular interval from the reticulated tube 10 of a predetermined length. Here, the reticulated tube 10 of 3 m was prepared, and four test pieces of 5 cm were sampled at an interval of approximately 1 m including both ends of the reticulated tube 10. Next, the sampled test pieces were developed as illustrated in FIG. 16, and the developed test pieces were sandwiched between transparent acrylic boards. Then, the test pieces were captured over the acrylic board and image data was acquired, a region of the openings 10A on the image data and a region of the peripheral parts 10B on the image data were each specified, and the area S1 and the area S2 were measured. Here, the image data was acquired by using a digital microscope (made by Keyence Corporation, VHX-6000) for capturing the test pieces. It should be noted that the pitch P and the inner diameter D were also measured based on the image data acquired by similarly capturing the test pieces (described later: cf. FIG. 19).

Work for actually attaching, to a closure, the reticulated tube 10 through which a bundle of the optical fibers 5 was inserted was performed, and an evaluation of whether the optical fibers 5 (optical fiber ribbon inserted through the reticulated tube 10) or the peripheral part 10B (the first wire 11 and the second wire 12) constituting the reticulated tube 10 was caught on a peripheral member during the attachment work was performed. Absence of catching was evaluated as "o (good)", and presence of catching was evaluated as "x (poor)".

FIG. 17 is a table illustrating an evaluation in the first example. As illustrated in the table, the smaller a mesh ratio was, the less likely the peripheral part 10B constituting the reticulated tube 10 tended to be caught on the peripheral member. When the mesh ratio was less than or equal to 43.6%, catching could be eliminated. Thus, it was desirable that the mesh ratio of the reticulated tube 10 was less than or equal to 43.6%. In other words, when an area occupied by the openings 10A on the developed plane was S1 and an area occupied by the peripheral parts 10B on the developed plane was S2, it was desirable that a value of S1/(S1+S2) was less than or equal to 0.436. Further, as described later, when the mesh ratio was less than or equal to 55.5%, catching could be eliminated. Thus, it was desirable that the mesh ratio of the reticulated tube 10 was less than or equal to 55.5%. In other words, when an area occupied by the openings 10A on the developed plane was S1 and an area occupied by the peripheral parts 10B on the developed plane was S2, it was desirable that a value of S1/(S1+S2) was less than or equal to 0.555.

Second Example

FIG. 18 is a table illustrating a second example.

As the second example, a plurality of types of the reticulated tubes 10 varying in the number of the optical fibers 5, the number of the first wires 11 and the second wires 12, an inner diameter D of the reticulated tube 10, a pitch P, a unit diameter Y, and the like were created. A cross-sectional shape of the first wire 11 and the second wire 12 had a width of 2 mm and a thickness of 0.1 mm. An evaluation was performed by inserting, through the reticulated tube 10, bundles of 72 to 288 optical fibers 5 unitized by bundling a plurality of 12-core intermittently connected optical fiber ribbons.

Figure 19:
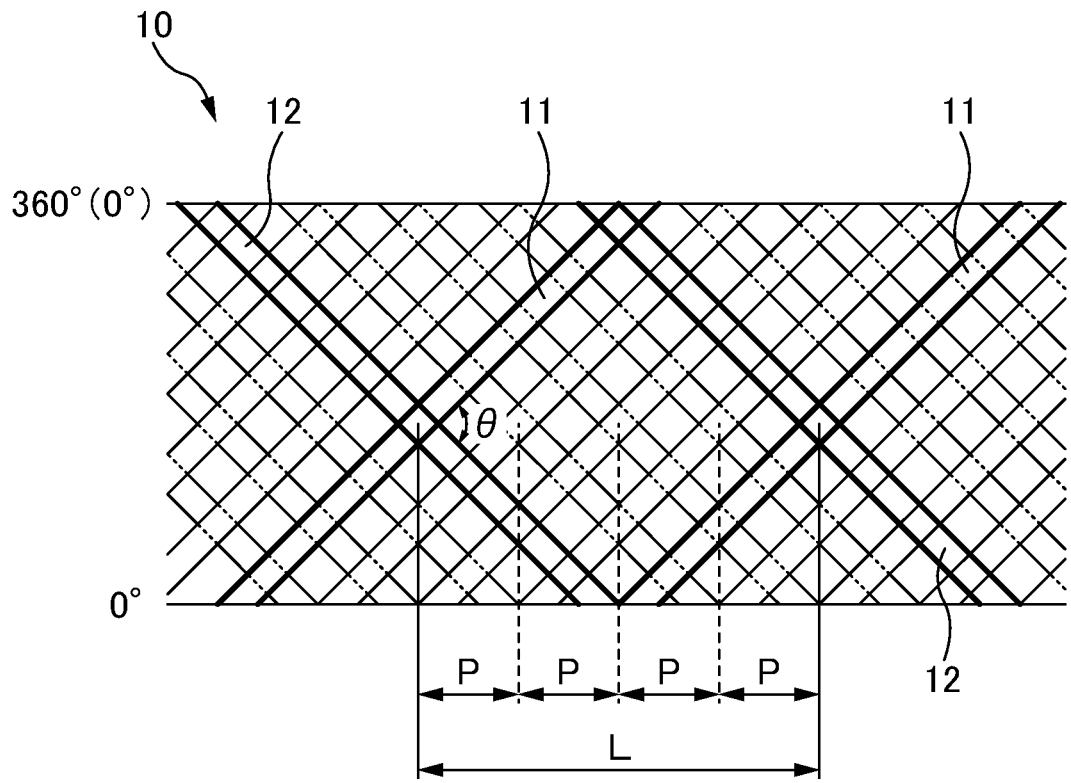
FIG. 19 is an explanatory diagram of a pitch P and an inner diameter D according to one or more embodiments.

FIG. 19 is an explanatory diagram of a pitch P and an inner diameter D.

When the number of the first wires 11 (or the second wires 12) was s and a spiral pitch of the first wires 11 for one turn as illustrated in the diagram was L (mm), the pitch P (mm) was P=L/s. As illustrated in the diagram, when an angle (size of an angle open toward the longitudinal direction) of an intersection point of the first wire 11 and the second wire 12 was θ, the inner diameter D (mm; diameter of an inside dimension) was calculated as in the following equation.

$$D = L \times \tan(\theta/2)/\pi$$

A unit diameter Y (mm) was a diameter of a unit (bundle of the optical fibers 5) inserted through the reticulated tube 10. When a total cross-sectional area of a structure of a unit (for example, the optical fibers 5) inserted through the reticulated tube 10 was S (mm²), the unit diameter Y (mm) was calculated as in the following equation.

$$Y = 1.46 \times \sqrt{S}$$

In an evaluation of "wire passing workability", workability when the optical fibers 5 were passed through the reticulated tube 10 was determined. Then, a case where the optical fibers 5 could be easily passed was evaluated as "o (good)", and a case where the optical fiber 5 was caught on the reticulated tube 10 was evaluated as "Δ (fair)" or "× (poor)".

In an evaluation of "constricting or protruding", when the reticulated tube 10 together with the optical fibers 5 were stretched out, presence or absence of constricting of the optical fibers 5 by the reticulated tube 10 and presence or absence of protruding of the optical fiber 5 from the opening 10A of the reticulated tube 10 were determined. Then, a case where none of constricting and protruding occurred was evaluated as "o (good)", and a case where constricting or protruding occurred was evaluated as "× (poor)".

In an evaluation of "handleability", ease of handling of the reticulated tube 10 through which the optical fibers 5 were inserted was determined. Then, a case where the reticulated tube 10 through which the optical fibers 5 were inserted was easily handled was evaluated as "o (good)", a case where there was a gap between the reticulated tube 10 and the optical fibers 5 and the optical fibers 5 move inside the reticulated tube 10 was evaluated as "A (fair)", and a case where there was a possibility that the optical fiber 5 protruding from the opening 10A of the reticulated tube 10 was caught on an obstacle was evaluated as "× (poor)".

In an "overall evaluation", a case where all evaluation results of "wire passing workability", "constricting or protruding", and "handleability" were "o (good)" was evaluated as "o (good)", and a case where any of the evaluation items was other than "o (good)" was evaluated as "× (poor)".

Incidentally, when the inner diameter D of the reticulated tube 10 was small, there was a possibility that the optical fibers 5 may be constricted. On the other hand, when the inner diameter D was great, a gap between the reticulated tube 10 and the optical fibers 5 was more likely to be generated, and the optical fibers 5 were more likely to move inside the reticulated tube 10. However, a phenomenon in which the reticulated tube 10 constricted the optical fibers 5 and the optical fibers 5 moved inside the reticulated tube 10 not only depended on the inner diameter D, but also depended on a diameter (unit diameter Y) of a unit inserted through the reticulated tube 10. Thus, here, a value of D/Y was calculated as an index indicating the size of the inner diameter D with respect to the unit diameter Y.

The longer the pitch P of the reticulated tube 10 was, the greater the amount of deformation when the peripheral parts 10B of the reticulated tube 10 was bent, and an inner diameter of the reticulated tube 10 after deformation could be substantially increased. Thus, here, in addition to the index (D/Y) indicating the size of the inner diameter D with respect to the unit diameter Y, a value (P×D/Y) acquired by multiplying the index (D/Y) by the pitch P was also calculated.

As indicated in the evaluation result, when D/Y was 1.4 (number 9), the overall evaluation was "× (poor)". The reason was that there was a gap between the reticulated tube 10 and the optical fibers 5, and the optical fibers 5 moved inside the reticulated tube 10. Thus, it was desirable that D/Y was less than or equal to 1.2. As indicated in the evaluation result, when D/Y was 0.5 (number 40), the overall evaluation was "× (poor)". The reason was that constricting of the optical fibers 5 occurred because the diameter (unit diameter) of the unit inserted through the reticulated tube 10 was great with respect to the inner diameter D of the reticulated tube 10. Thus, it was desirable that D/Y was greater than or equal to 0.6. In other words, it was desirable that D/Y was greater than or equal to 0.6 and less than or equal to 1.2 (0.6≤D/Y≤1.2).

As indicated in the evaluation result, when P×D/Y was 4.8 (mm) (number 14), the overall evaluation was "× (poor)". The reason was that constricting of the optical fibers 5 occurred because the diameter (unit diameter) of the unit inserted through the reticulated tube 10 was great with respect to the inner diameter D of the reticulated tube 10. Thus, it was desirable that P×D/Y was greater than or equal to 6.0 (mm). It should be noted that a conceivable reason why the overall evaluation was "× (poor)" in the number 40

(P×D/Y was 6.0) was that D/Y was small. As indicated in the evaluation result, when P×D/Y was greater than or equal to 21.3 (mm) (numbers 1, 17 to 19, and 30), the overall evaluation was "× (poor)". The reason was that protruding of the optical fiber 5 occurred. Thus, it was desirable that P×D/Y was less than or equal to 20.0. In other words, it was desirable that P×D/Y was greater than or equal to 6.0 (mm) and less than or equal to 20.0 (mm) (6.0 (mm)≤P×D/Y≤20.0 (mm)).

Therefore, when 0.6≤D/Y≤1.2 and 6.0 (mm)≤P×D/Y≤20.0 (mm), all evaluation results of "wire passing workability", "constricting or protruding", and "handleability" were "o (good)", and "overall evaluation" was "o (good)". Thus, it was desirable that 0.6≤D/Y≤1.2 and 6.0 (mm)≤P×D/Y≤20.0 (mm).

Third Example

FIG. 20 is a table illustrating a third example.

As the third example, four first wires 11 and four second wires 12 (eight in total) were prepared, and a plurality of types of the reticulated tube 10 varying in a material of the first wires 11 and the second wires 12 were created. A material of the first wires 11 and the second wires 12 was three types of a "double-layer monofilament", a "single-layer monofilament", and a "film" (cf. FIGS. 3A to 3C). A cross-sectional shape (thickness) of each material (the first wires 11 and the second wires 12) varied. It should be noted that a thickness of each material (corresponding to T in FIGS. 3A to 3C) was measured by a thickness gage (thus, the "film" tended to have a value smaller than a value of the "double-layer monofilament" and the "single-layer monofilament"). In the third example, the first wire 11 and the second wire 12 were bonded together with an adhesive, and the reticulated tube 10 was created (in contrast, in a fourth example described later, the first wire 11 and the second wire 12 were fused).

A contraction ratio when each reticulated tube 10 was contracted in the longitudinal direction was calculated. Here, the contraction ratio referred to a ratio of a length of the reticulated tube during contraction to a length of the reticulated tube 10 before contraction. In other words, when a length (initial length) of the reticulated tube 10 before contraction in the longitudinal direction was L0 and a length (length during contraction) of the reticulated tube 10 after contraction in the longitudinal direction was L1, a contraction ratio R1(%) was as in the following equation.

$$R1(\%) = L1/L0 \times 100$$

It should be noted that, the smaller a value of the contraction ratio R1(%) was, the longer the optical fibers 5 and the reticulated tube 10 can be pulled out when the optical fibers 5 illustrated in FIG. 11C were laid, which was advantageous.

As illustrated in FIG. 20, in any material, the thinner a cross-sectional shape was, the higher the contraction ratio R1. The reason was that, the thinner the first wire 11 and the second wire 12 were in a thickness direction, the more likely the bent peripheral part 10B was to be displaced in the radial direction as illustrated in FIG. 7B, and, as a result, the amount of contraction in the longitudinal direction increased. It should be noted that, as illustrated in FIG. 7B, it could be determined from the result that it was advantageous that the bent peripheral parts 10B was more likely to be displaced in the radial direction.

As illustrated in FIG. 20, in all cases, the contraction ratio R1(%) being set to less than or equal to 13% was achieved.

As illustrated in FIG. 20, in a case of the "double-layer monofilament" and the "single-layer monofilament", a value of the contraction ratio R1 was smaller than that of the "film". Specifically, in the "film", the contraction ratio R1(%) was 11 to 13%, and the reticulated tube 10 did not contract from the initial length L0 to less than or equal to 1/10 thereof. In contrast, in the "double-layer monofilament" and the "single-layer monofilament", the contraction ratio R1(%) was 4 to 8%, and the reticulated tube 10 could be contracted from the initial length L0 to less than or equal to 1/10 thereof (could contract from the initial length L0 to 1/25 to 1/12.5 thereof). A conceivable reason why a difference was generated in values of the contraction ratio R1 in such a manner is that, as illustrated in FIG. 7B, the bent peripheral parts 10B were more likely to be displaced in the radial direction in the "double-layer monofilament" and the "single-layer monofilament" acquired by integrally fusing many fibers than the film. Thus, it was more desirable that a material (the first wire 11 and the second wire 12) of the reticulated tube 10 had a monofilament structure (double-layer monofilament or single-layer monofilament) acquired by integrally fusing many fibers than a film shape. In this way, it was desirable that the contraction ratio R1(%) of the reticulated tube 10 was less than or equal to 13%. In other words, when a length (initial length) of the reticulated tube 10 before contraction in the longitudinal direction was L0 and a length (length during contraction) of the reticulated tube 10 after contraction in the longitudinal direction was L1, it was desirable that L1/L0 was less than or equal to 0.13. It was desirable that the contraction ratio R1(%) of the reticulated tube 10 was less than or equal to 8%. In other words, when a length (initial length) of the reticulated tube 10 before contraction in the longitudinal direction was L0 and a length (length during contraction) of the reticulated tube 10 after contraction in the longitudinal direction was L1, it was desirable that L1/L0 was less than or equal to 0.08.

Fourth Example

FIG. 21 is a table illustrating a fourth example.

As the fourth example, four first wires 11 and four second wires 12 (eight in total) were prepared, and a plurality of types of the reticulated tube 10 varying in a material of the first wires 11 and the second wires 12 were created. A material of the first wires 11 and the second wires 12 was two types of a "double-layer monofilament" and a "single-layer monofilament" (cf. FIGS. 3A and 3B). A cross-sectional shape (thickness T illustrated in FIGS. 3A and 3B) of each material (the first wires 11 and the second wires 12) varied. In the fourth example, the first wire 11 and the second wire 12 were fused, and the reticulated tube 10 was created. By actually attaching, to a closure, the reticulated tube 10 through which a bundle of optical fibers 5 were inserted, and also performing a heat cycle test (temperature condition: −40° C. to +70° C., two cycles) on the closure, a loss fluctuation amount (dB) of the optical fibers 5 at that time was measured (measurement wavelength 1.55 μm).

As illustrated in FIG. 21, the "single-layer monofilament" had a loss fluctuation amount of the optical fibers 5 greater than that of the "double-layer monofilament". A conceivable reason is that heat contraction due to a heat load was more likely to occur in the reticulated tube 10 using the single-layer monofilament, and, as a result, the optical fibers 5 inserted through the inside were constricted, and a transmission loss of the optical fibers 5 increased. In contrast, in the reticulated tube 10 using the double-layer monofilament, the core parts 13 was not melted even during manufacturing of the reticulated tube 10, and thus it was conceivable that the reticulated tube 10 was less likely to thermally contract even when a heat load was applied. Thus, the double-layer monofilament was more desirable as a material (the first wire 11 and the second wire 12) of the reticulated tube 10 than the single-layer monofilament.

The heat contraction ratio of the double-layer monofilament described above could be measured as follows. First, two gage marks were made at a predetermined interval (here, an interval of 1000 mm) on a sample (wire) of 2500 mm. Next, the sample was put in a thermostat oven at 80° C. for two hours. After the sample was taken out of the thermostat oven and left in a room temperature environment at 23° C.±2° C. (21° C. to 25° C.) for 30 minutes, the interval between the two gage marks was measured. When a first interval (here, 1000 mm) between two gage marks before heat treatment was Lb and an interval between the two gage marks measured after heat treatment was La, a heat contraction rate Rt (%) could be calculated as in the following equation.

$$Rt(\%) = \{(Lb-La)/Lb\} \times 100$$

Then, when the heat contraction rate Rt (%) of the first wire (and the second wire) was less than or equal to 1%, the reticulated tube 10 was less likely to thermally contract even when a heat load is applied, and a loss fluctuation amount of the optical fibers 5 can be suppressed. Thus, it was desirable that the heat contraction ratio Rt (%) of the first wire (and the second wire) was less than or equal to 1%.

It should be noted that it was desirable that the core parts 13 was not melted during manufacturing of the reticulated tube 10, and thus it was desirable that a melting point of the core parts 13 of the first wire 11 and the second wire 12 constituting the reticulated tube 10 was higher than a melting point of the sheath part 14 by greater than or equal to 20° C. A maximum temperature of a usage environment of the closure is generally about 80° C., and thus it was desirable that a melting point of the sheath part 14 is greater than or equal to 100° C.

{Reference Description}

With Regard to Young's Modulus and Flexural Rigidity of Wire:

A Young's modulus and flexural rigidity of the wire (the first wire 11 or the second wire 12) of the double-layer monofilament illustrated in FIG. 3A were measured. Here, the wire of the double-layer monofilament constituted by an organic material was created with the core parts 13 being polyester and the sheath part 14 being polypropylene. A cross-sectional shape of the wire had a thickness of 0.1 mm and a width of 1 mm. As a result of the measurement, a Young's modulus of the wire was approximately 4000 N/mm$^2$, and flexural rigidity was approximately 0.5 N/mm$^2$. It should be noted that the Young's modulus and flexural rigidity of the wire were measured as follows.

The Young's modulus was measured by using a tensile testing machine. Here, a test piece (wire) was set between chucks set to 200 mm, and a load-elongation curve was measured with a tensile speed as 200 mm/min. The Young's modulus (unit: N/mm$^2$) of the wire was measured based on an initial inclination of a straight line part of the measured load-elongation curve.

Figure 22A:
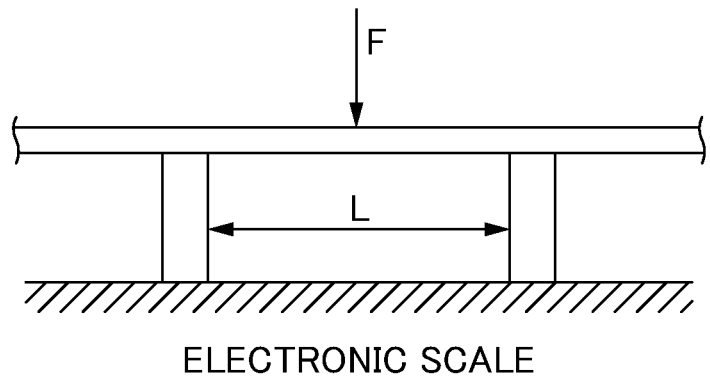
FIG. 22A is an explanatory diagram of a method for measuring flexural rigidity according to one or more embodiments.
Figure 22B:
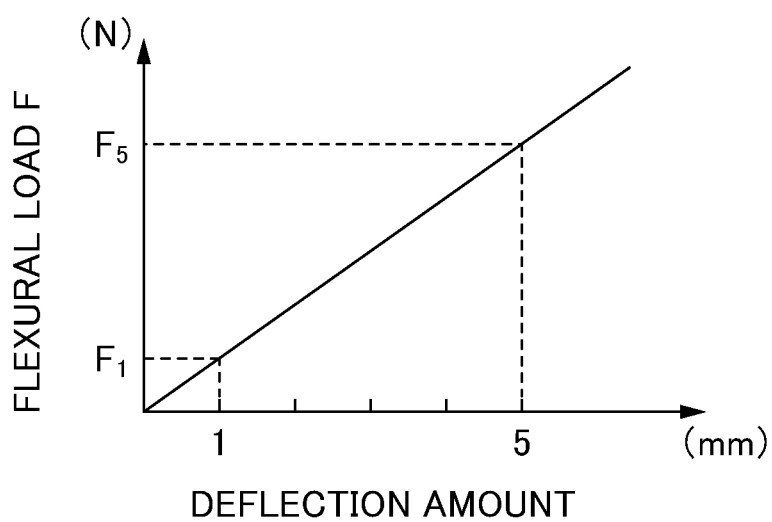
FIG. 22B is an explanatory diagram of a load-deflection diagram according to one or more embodiments.

The flexural rigidity was measured based on a three-point flexural test. FIG. 22A is an explanatory diagram of a method for measuring flexural rigidity. FIG. 22B is an explanatory diagram of a load-deflection diagram. As illustrated in FIG. 22A, a test piece (wire) was set between fulcrums having a distance L set to 30 mm, and a flexural modulus of elasticity E was measured based on the three-point flexural test. Here, a flexural load F1 when a deflection amount was 1 mm and a flexural load F5 when a deflection amount was 5 mm were measured (cf. FIG. 22B), and a flexural modulus of elasticity E was measured based on the measured flexural loads F1 and F5. It should be noted that the flexural load F1 was measured by using an electronic scale disposed under the fulcrums. Flexural rigidity EI (unit: N mm$^2$) was calculated based on the measured flexural modulus of elasticity E (unit: Pa) and an elastic secondary moment I (unit: mm$^4$) of the test piece.

With Regard to Contraction Ratio R1:

A plurality of types of the protective units 20 varying in the number N (total number 2N) of each of the first wires 11 and the second wires 12, an inner diameter D of the reticulated tube 10, a spiral pitch L, and an outer diameter S of the tubular member 22 were created. Here, the number of the first wires 11 and the second wires 12 was each four (eight in total) or six (12 in total). The inner diameter D of the reticulated tube 10 fell in a range of 6.3 mm to 8.3 mm. The spiral pitch L was 20 mm to 100 mm. The outer diameter S of the tubular member 22 fell in a range of 3.5 mm to 8 mm.

A contraction ratio R1 when each reticulated tube 10 was contracted in the longitudinal direction was measured. It should be noted that, when a length (initial length) of the reticulated tube 10 before contraction in the longitudinal direction was L0 and a length (length during contraction) of the reticulated tube 10 after contraction in the longitudinal direction was L1, a contraction ratio R1(%) was as in the following equation.

$$R1(\%) = L1/L0 \times 100$$

A measurement result of the contraction ratio R1 of each reticulated tube 10 was as in the following table (it was determined that the contraction ratio R1 of 3 to 12% could be achieved). It should be noted that, when each reticulated tube 10 was contracted in the longitudinal direction, the reticulated tube 10 could be easily folded in the longitudinal direction with force of a hand, and buckling of the tubular member 22 did not occur.

TABLE 1

| Total number 2N | 12 | 12 | 12 | 12 | 8 | 12 | 12 |
|---|---|---|---|---|---|---|---|
| Inner diameter D [mm] | 7 | 8.3 | 8 | 7 | 6.3 | 7 | 7 |
| Spiral pitch L [mm] | 100 | 50 | 30 | 20 | 30 | 20 | 20 |
| Outer diameter S [mm] | 8 | 8 | 8 | 3.5 | 6 | 5 | 6 |
| Contraction ratio R1 [ %] | 3 | 5 | 7 | 8 | 8.8 | 10 | 12 |

With Regard to Mesh Ratio R:

A plurality of types of the reticulated tubes 10 varying in a mesh ratio R were created by changing the number of the first wires 11 and the second wires 12 of the reticulated tube 10 and a spiral pitch. Here, the number of the first wires 11 and the second wires 12 was each four (eight in total) or six (12 in total). The spiral pitch was 50 mm or 100 mm. When a ratio of an area occupied by the openings 10A on the developed plane to a total area (sum of the area occupied by the openings 10A and an area occupied by the peripheral parts 10B) of the reticulated tube on the developed plane was the mesh ratio R (%), the mesh ratios R of the respective reticulated tubes 10 were 46.2%, 55.5%, and 49.4%.

Work for actually attaching, to a closure, the reticulated tube 10 through which a bundle of the optical fibers 5 was inserted was performed, and an evaluation of whether the optical fibers 5 (optical fiber ribbon inserted through the reticulated tube 10) or the peripheral part 10B (the first wire 11 and the second wire 12) constituting the reticulated tube 10 was caught on a peripheral member during the attachment work was performed. Absence of catching was evaluated as "∘ (good)", and presence of catching was evaluated as "× (poor)". An evaluation result of catching of each reticulated tube 10 on the peripheral member was as in the following table.

TABLE 2

| Total number 2N | 12 | 12 | 8 |
|---|---|---|---|
| Spiral pitch L [mm] | 50 | 100 | 50 |
| Mesh ratio [%] | 46.2 | 55.5 | 49.4 |
| Catching on peripheral member | ∘ | ∘ | ∘ |

With Regard to Protruding of Optical Fiber:

A plurality of types of the reticulated tubes 10 varying in the number n of the optical fibers, the number N (total number 2N) of each of the first wires 11 and the second wires 12, an inner diameter D of the reticulated tube 10, a pitch P, and a shape of the opening 10A were created. Here, the number of 12-core intermittently connected optical fiber ribbons was 12 or 24, and the number n of the optical fibers was 144 or 288. The number of the first wires 11 and the second wires 12 was each four (eight in total) or six (12 in total). The inner diameter D of the reticulated tube 10 fell in a range of 6.3 mm to 8.3 mm. The pitch P was 8.3 mm to 45 mm (the spiral pitch was 50 mm to 270 mm). A shape of the openings was a rhombus, and two diagonal lines of the rhombus had different lengths (the table describes a length of a diagonal line along the longitudinal direction (opening length in the longitudinal direction) and a length of a diagonal line along the circumferential direction (opening length in the circumferential direction)).

When each reticulated tube 10 was bent at a flexural radius of 15 mm, presence or absence of protruding of the optical fiber 5 from the opening 10A of the reticulated tube 10 was determined. Furthermore, when the reticulated tube in a bent state was pulled inward (flexural center side), presence or absence of protruding of the optical fiber 5 from the opening 10A of the reticulated tube 10 was determined. A result of the presence or absence of protruding of the optical fiber in each reticulated tube 10 was as in the following table.

TABLE 3

| Number n of optical fibers | 288 | 288 | 288 | 288 | 144 |
|---|---|---|---|---|---|
| Total number 2N | 12 | 12 | 12 | 12 | 8 |
| Inner diameter D [mm] | 8.3 | 7 | 7.3 | 7 | 6.3 |
| Pitch P [mm] | 8.3 | 17 | 25 | 45 | 12.5 |
| Opening shape | Rhombus | Rhombus | Rhombus | Rhombus | Rhombus |
| Opening length in longitudinal direction | 6 mm | 14 mm | 18 mm | 35 mm | 5 mm |
| Opening length in circumferential direction | 3 mm | 4 mm | 4 mm | 3.5 mm | 3.5 mm |
| Protruding (when bent) | No | No | No | Yes | No |
| Protruding (when pulled) | No | No | Yes | Yes | No |

As illustrated in Table 3, the shorter the opening length in the longitudinal direction, the less likely the optical fiber 5 tended to protrude from the opening 10A of the reticulated tube 10. In a case that a shape of the opening was a rhombus, protruding of the optical fiber 5 when the reticulated tube 10 was bent could be suppressed with the opening length in the longitudinal direction being less than or equal to 18 mm. In a case that a shape of the opening was a rhombus, protruding of the optical fiber 5 when the reticulated tube 10 in a bent state was pulled could also be suppressed with the opening length in the longitudinal direction being less than or equal to 14 mm.

Next, a plurality of types of the reticulated tubes 10 further varying in a shape of the opening 10A were created. Here, the reticulated tube 10 was constituted as one cylindrical member in which many openings 10A were formed, and the openings 10A were formed into a slit shape or a rectangular shape. It should be noted that, in a case of the openings 10A having a slit shape, slits were formed along the longitudinal direction, and a slit width (length of the opening in the circumferential direction) was less than 0.5 mm. It should be noted that a width (dimension of the peripheral part 10B in the circumferential direction) of the peripheral part 10B between the opening 10A and the opening 10A adjacent to each other in the circumferential direction was 4 mm in a case of the openings 10A having a slit shape, and was 2 mm in a case of the openings 10A having a rectangular shape. Similarly to the description above, presence or absence of protruding of the optical fiber 5 from the opening 10A of the reticulated tube 10 when the reticulated tube 10 was bent and when the reticulated tube 10 in a bent state was pulled inward was determined. A result of the presence or absence of protruding of the optical fiber in each reticulated tube 10 was as in the following table.

TABLE 4

| Number n of optical fibers | 288 | 288 | 288 | 288 | 288 | 288 |
|---|---|---|---|---|---|---|
| Inner diameter D [mm] | 8 | 8 | 8 | 8 | 8 | 8 |
| Pitch P [mm] | 12 | 22 | 42 | 12 | 22 | 42 |
| Opening shape | Slit | Slit | Slit | Rectangle | Rectangle | Rectangle |
| Length in extension direction | 10 mm | 20 mm | 40 mm | 10 mm | 20 mm | 40 mm |
| Length of opening in circumferential direction | <0.5 mm | <0.5 mm | <0.5 mm | 2 mm | 2 mm | 2 mm |
| Protruding (when bent) | No | No | Yes | No | No | Yes |
| Protruding (when pulled) | No | Yes | Yes | No | Yes | Yes |

As illustrated in Table 3 and Table 4, regardless of a shape of the opening 10A, as the opening length in the longitudinal direction was shorter, the optical fiber 5 tended to be less likely to protrude from the opening 10A of the reticulated tube 10. Protruding of the optical fiber 5 when the reticulated tube 10 was bent could be suppressed with the opening length in the longitudinal direction of the opening 10A being less than or equal to 20 mm. Protruding of the optical fiber 5 when the reticulated tube 10 in a bent state was pulled could also be suppressed with the opening length in the longitudinal direction of the opening 10A being less than or equal to 14 mm.

With Regard to Strength of Branch Part:

A plurality of types of the reticulated tubes 10 varying in the number N (total number 2N) of each of the first wires 11 and the second wires 12, an inner diameter D of the reticulated tube 10, and a pitch P were created. Here, the number of the first wires 11 and the second wires 12 was each four (eight in total) or six (12 in total). The inner diameter D of the reticulated tube 10 was 6.3 mm or 8.3 mm. The spiral pitch L was 50 mm.

By applying a tensile force of 180 N to each reticulated tube 10, presence or absence of separation between the first wire 11 and the second wire 12 of the branch part 10C (the branch part 10C acquired by fusion-bonding at an intersection point of the first wire 11 and the second wire 12) was determined. A result of the presence or absence of separation of the branch part 10C in each reticulated tube 10 was as in the following table (it was determined that the branch part 10C was not destroyed by the tensile force of 180 N).

TABLE 5

| Total number 2N | 12 | 8 |
|---|---|---|
| Inner diameter D [mm] | 8.3 | 6.3 |
| Spiral pitch L [mm] | 50 | 50 |
| Presence or absence of separation | No | No |

With Regard to Bundle of Reticulated Tubes 10:

12 optical fiber units 3 in which 288 optical fibers were inserted through the reticulated tube 10 having an outer diameter of 8.3 mm were prepared, the 12 optical fiber units 3 were bundled, and an outer circumference length of the bundle of the 12 optical fiber units was measured. For comparison, 12 protective tubes (outer diameter of 9.7 mm and wall thickness of 0.7 mm) made of polyethylene through which 288 optical fibers are inserted were prepared, the 12 protective tubes were bundled, and an outer circumference length of the bundle of the 12 protective tubes was measured. It should be noted that a string was wrapped around the outer circumference of the bundled 12 optical fiber units or the outer circumference of the bundled 12 protective tubes, and a length of the string was measured, and thus an outer circumference length of each of the bundles was measured. Since a cross-sectional shape of the optical fiber unit 3 using the reticulated tube 10 was more likely to become deformed than that of the protective tube made of polyethylene, an outer circumference length of the bundle of the 12 protective tubes made of polyethylene was 14 mm, whereas an outer circumference length of the bundle of the 12 optical fiber units 3 using the reticulated tube 10 was 10 mm.

{Others}

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical Cable;
3: Optical fiber unit;
5: Optical fiber;
10: Reticulated tube;
10A: Opening;
10B: Peripheral part;
10C: Branch part;
10X: End part (first end, second end);
11: First wire;
12: Second wire;
13: Core part;
14: Sheath part;
20: Protective unit;
22: Tubular member;
22A: First end;
22B: Second end;
40: Rack;
41: Terminal apparatus;
42: Optical module;
44: Connector connecting port;
50: Branch member;
51: Body part;
52: First fixing part;
521: Support part;
522: Fastening member;
53: Second fixing part;
531: Holding part;
531A: Recessed part;
54: Housing part;
541: Upstream stopper;
542: Downstream stopper;
57: Lid;
57A: Injection opening;
70: Manufacturing device;
71: First supply section;
71A: First supply source;
71B: First rotation part;
72: Second supply section;
72A: Second supply source;
72B: Second rotation part;
73: Guiding section;
74: Heating section;
75: Tube contracting section.

What is claimed is:

1. An optical fiber protective unit comprising:
a reticulated tube; and
a tubular member that is inserted through the reticulated tube and that is configured to accommodate a plurality of optical fibers, wherein
the reticulated tube is disposed on an outer periphery of the tubular member in a state folded in a longitudinal direction,
both end parts of the reticulated tube are located on the outer periphery of the tubular member, and
the reticulated tube in an extended state is longer than the tubular member.

2. The optical fiber protective unit according to claim 1, wherein
one of the end parts of the reticulated tube is temporarily fixed to the tubular member.

3. The optical fiber protective unit according to claim 1, wherein
there is exactly one said reticulated tube disposed on the outer periphery of the tubular member.

4. The optical fiber protective unit according to claim 1, wherein
the tubular member is slidable with respect to the plurality of optical fibers.

5. The optical fiber protective unit according to claim 1, wherein
when the reticulated tube is extended, an inner diameter of the reticulated tube does not decrease.

6. The optical fiber protective unit according to claim 1, wherein
L1/L0 is less than or equal to 0.13,
where
L0 is a length of the reticulated tube before contraction in the longitudinal direction, and
L1 is a length of the reticulated tube after contraction in the longitudinal direction.

7. An optical fiber protective unit comprising:
a reticulated tube; and
a tubular member that is inserted through the reticulated tube and that is configured to accommodate a plurality of optical fibers, wherein
the reticulated tube is disposed on an outer periphery of the tubular member in a state folded in a longitudinal direction,
both end parts of the reticulated tube are located on the outer periphery of the tubular member,
wires constitute the reticulated tube, and
an intersection angle of the wires is not variable.

8. An optical fiber protective unit comprising:
a reticulated tube; and
a tubular member that is inserted through the reticulated tube and that is configured to accommodate a plurality of optical fibers, wherein
the reticulated tube is disposed on an outer periphery of the tubular member in a state folded in a longitudinal direction,
both end parts of the reticulated tube are located on the outer periphery of the tubular member,
the reticulated tube in a folded state is extendable in the longitudinal direction by pulling out one of the end parts of the reticulated tube from the tubular member
an opening of one of the end parts of the tubular member is widened, and
an outer diameter of the end part having a widened opening is greater than the inner diameter of the reticulated tube in the folded state.

9. A method for protecting an optical fiber, the method comprising:
preparing an optical fiber protective unit comprising
a reticulated tube, and
a tubular member inserted through the reticulated tube that is in a state folded in a longitudinal direction, such that the reticulated tube is disposed in a folded state on an outer periphery of the tubular member;
inserting a plurality of optical fibers into the tubular member, and thereby inserting the plurality of optical fibers into the reticulated tube in the folded state;
pulling out an end part of the reticulated tube from the tubular member; and
extending the folded-state reticulated tube in the longitudinal direction, to thereby insert the plurality of optical fibers into the reticulated tube in an extended state.

10. The method for protecting an optical fiber according to claim 9, wherein,
after pulling out the end part of the reticulated tube from the tubular member, the tubular member, which has the reticulated tube disposed on the outer periphery thereof, and the plurality of optical fibers are caused to slide relative to one another, to thereby insert the plurality of optical fibers into the reticulated tube.

11. The method for protecting an optical fiber according to claim 10, wherein,
after pulling out the end part of the reticulated tube from the tubular member, the tubular member, which has the reticulated tube disposed on the outer periphery thereof, is caused to slide with respect to the plurality of optical fibers, to thereby insert the plurality of optical fibers into the reticulated tube.

12. The method for protecting an optical fiber according to claim 11, wherein
the optical fibers extend out from a lead part of an optical cable, and
the end part of the reticulated tube, which has been pulled out from the tubular member, is fixed to the lead part of the optical cable.

13. The method for protecting an optical fiber according to claim 10, wherein,
after pulling out the end part of the reticulated tube from the tubular member, the optical fibers, together with the pulled-out end part, are caused to slide with respect to the tubular member, which has the reticulated tube disposed on the outer periphery thereof, to thereby insert the plurality of optical fibers into the reticulated tube.

14. The method for protecting an optical fiber according to claim 10, wherein
the tubular member, which has the reticulated tube disposed on the outer periphery thereof, is fixed in a state where the plurality of optical fibers are inserted into the reticulated tube, which has been pulled out from the tubular member and extended.

15. The method for protecting an optical fiber according to claim 14, wherein
the plurality of optical fibers constitute an optical fiber group from a single optical cable.

16. The method for protecting an optical fiber according to claim 14, wherein
a plurality of optical fiber groups branch from a single optical cable, and
one or more of the optical fiber groups branching from the single optical cable are inserted through a respective one of the tubular member and the reticulated tube.

17. The method for protecting an optical fiber according to claim 16, wherein
an end part of the optical cable is fixed to a first fixing part of a branch unit; and
the tubular member is fixed to a second fixing part of the branch unit that is different from the first fixing part.

* * * * *